US012206458B2

(12) United States Patent
Katayama et al.

(10) Patent No.: US 12,206,458 B2
(45) Date of Patent: Jan. 21, 2025

(54) COMMUNICATION APPARATUS AND OPTICAL COMMUNICATION SYSTEM

(71) Applicant: NIPPON TELEGRAPH AND TELEPHONE CORPORATION, Tokyo (JP)

(72) Inventors: Yohei Katayama, Musashino (JP); Kazumitsu Sakamoto, Musashino (JP); Kento Yoshizawa, Musashino (JP); Hiroyuki Fukumoto, Musashino (JP); Takuya Ohara, Musashino (JP); Takeshi Kinoshita, Musashino (JP); Etsushi Yamazaki, Musashino (JP); Takayuki Mizuno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 98 days.

(21) Appl. No.: 18/011,585

(22) PCT Filed: Jun. 24, 2020

(86) PCT No.: PCT/JP2020/024782
§ 371 (c)(1),
(2) Date: Dec. 20, 2022

(87) PCT Pub. No.: WO2021/260832
PCT Pub. Date: Dec. 30, 2021

(65) Prior Publication Data
US 2023/0291479 A1    Sep. 14, 2023

(51) Int. Cl.
*H04B 10/00*    (2013.01)
*H04B 10/11*    (2013.01)
*H04B 10/508*    (2013.01)
*H04J 14/00*    (2006.01)

(52) U.S. Cl.
CPC .......... *H04B 10/508* (2013.01); *H04B 10/11* (2013.01)

(58) Field of Classification Search
CPC ................................................ H04B 10/1127
See application file for complete search history.

(56) References Cited

U.S. PATENT DOCUMENTS

| 2018/0026721 | A1 | 1/2018 | Bock et al. |
| 2019/0312639 | A1 | 10/2019 | Ono et al. |
| 2021/0013966 | A1* | 1/2021 | Haraguchi ......... H04B 10/1127 |

FOREIGN PATENT DOCUMENTS

| JP | H08-079174 A | 3/1996 |
| WO | WO-2018/110472 A1 | 6/2018 |

OTHER PUBLICATIONS

Yongxiong Ren et al., "Adaptive-optics-based simultaneous pre- and post-turbulence compensation of multiple orbital-angular-momentum beams in a bidirectional free-space optical link", Optica, vol. 1, No. 6, pp. 376-382, (2014).

* cited by examiner

Primary Examiner — Daniel G Dobson

(57) ABSTRACT

A communication device includes: a light output unit for outputting light; a light splitting unit for splitting the light output by the light output unit into a plurality of split beams; and a plurality of spatial optical communication units provided in correspondence to the plurality of split beams, wherein the spatial optical communication units respectively transmit a corresponding split beam which is input from the light splitting unit to a partner communication device across space.

5 Claims, 20 Drawing Sheets

COMMUNICATION APPARATUS AND OPTICAL COMMUNICATION SYSTEM

CROSS-REFERENCE TO RELATED APPLICATIONS

This application is a 371 U.S. National Phase of International Application No. PCT/JP2020/024782, filed on Jun. 24, 2020. The entire disclosure of the above application is incorporated herein by reference.

TECHNICAL FIELD

The present invention relates to a communication device (a communication apparatus) and an optical communication system.

BACKGROUND ART

Wireless communications using light of a shorter wavelength than those of radio waves have been utilized. Wireless communication using light is superior in power efficiency, communication capacity and directivity to wireless communications that use radio waves.

In the case of performing wireless communications using light between a communication station installed on the Earth and a communication station installed on a star outside the atmosphere (e.g., the moon), one problem is that the strength of optical signals transmitted and received by the communication station installed on the Earth significantly attenuate due to the effect of atmospheric turbulence around the Earth. As a solution to this, Non-Patent Literature 1 discloses a technique that prevents attenuation of power of optical signals by previously applying compensation processing to an optical signal to be transmitted based on an optical signal that is received at a communication station installed on the Earth from other communication station.

CITATION LIST

Non-Patent Literature

Non-Patent Literature 1: Yongxiong Ren et al., "Adaptive-optics-based simultaneous pre- and post-turbulence compensation of multiple orbital-angular-momentum beams in a bidirectional free-space optical link", Optica, Vol. 1, No. 6, pp. 376-382 (2014)

SUMMARY OF THE INVENTION

Technical Problem

A known approach to preventing reduction in signal strength in wireless communication is to transmit signals with aligned phases from multiple communication stations to increase directivity. For such an approach, techniques like adaptive array and MIMO (Multiple Input Multiple Output) are used. In wireless communications using light, however, the wavelength of the light is shorter than the wavelengths of radio waves and the influence of phase difference in optical elements forming a communication station or its system is not negligible, making phase alignment difficult.

The present invention has been made in view of these circumstances and an object thereof is to provide a communication device for transmitting optical signals from multiple devices such that phase difference is reduced at a receiving communication station in wireless communication using light.

Means for Solving the Problem

One aspect of the present invention is a communication device including: a light output unit for outputting light; a light splitting unit for splitting the light output by the light output unit into a plurality of split beams; and a plurality of spatial optical communication units provided in correspondence to the plurality of split beams, wherein the spatial optical communication units respectively transmit a corresponding split beam which is input from the light splitting unit to a partner communication device across space.

Effects of the Invention

The present invention can provide a communication device for transmitting optical signals with a reduced phase difference from multiple devices in wireless communication using light.

DESCRIPTION OF EMBODIMENTS

Embodiments of the present invention are described below in detail with reference to the drawings.

First Embodiment

Figure 1:
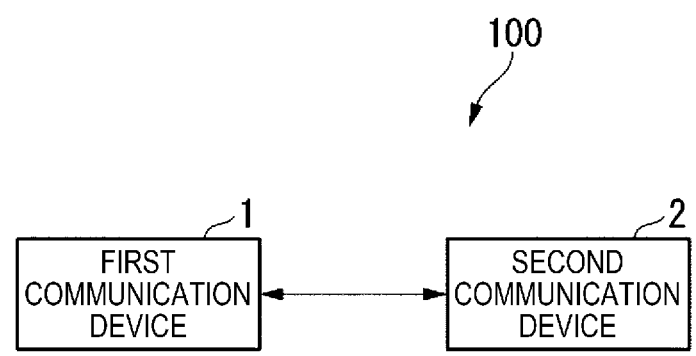
FIG. 1 shows an optical communication system according to a first embodiment.

FIG. 1 shows an optical communication system 100 according to a first embodiment.

The optical communication system 100 is a system for performing communications using optical signals between two remote locations. The optical communication system 100 includes a first communication device 1 and a second communication device 2.

The first communication device 1 is a communication station installed on the Earth. The second communication device 2 is a communication station installed on a star outside the atmosphere distant from the Earth (e.g., the moon) or flying in outer space.

In the optical communication system 100, the first communication device 1 and the second communication device 2 transmit and receive optical signals to/from each other.

Figure 2:
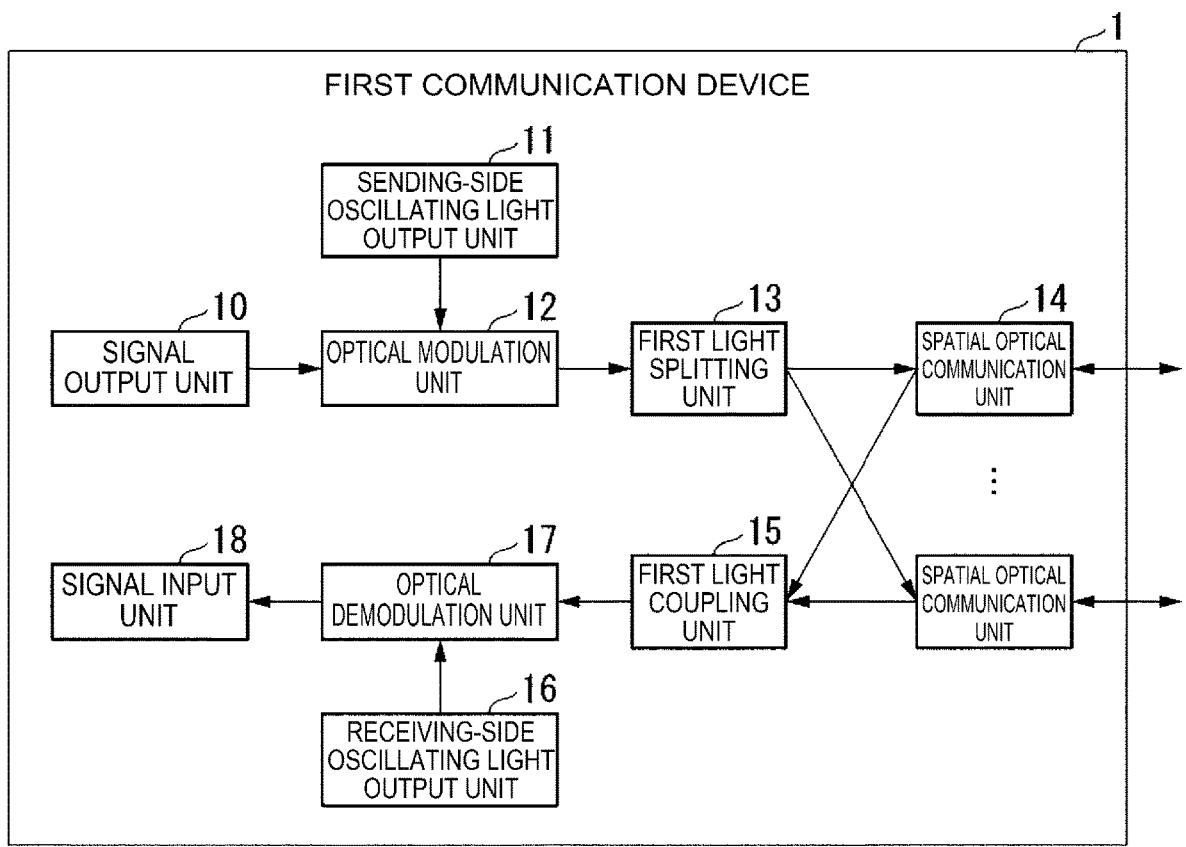
FIG. 2 shows a configuration of a first communication device according to the first embodiment.

FIG. 2 shows a configuration of the first communication device 1 according to the first embodiment.

The first communication device 1 includes a signal output unit 10, a sending-side oscillating light output unit 11 (a light source), an optical modulation unit 12, a first light splitting unit 13 (an optical splitter), spatial optical communication units 14 (spatial optical communication devices), a first light coupling unit 15 (an optical coupler), a receiving-side oscillating light output unit 16, an optical demodulation unit 17, and a signal input unit 18.

The signal output unit 10 outputs to the optical modulation unit 12 an electric signal indicating information to be transmitted to the second communication device 2. That is, an output end of the signal output unit 10 is connected with an input end of the optical modulation unit 12 via an electric cable.

The sending-side oscillating light output unit 11 outputs oscillating light to serve as a carrier of the optical signal to the optical modulation unit 12. That is, an output end of the sending-side oscillating light output unit 11 is connected with an input end of the optical modulation unit 12 via an optical cable.

The optical modulation unit 12 modulates the oscillating light input from the sending-side oscillating light output unit 11 with the signal input from the signal output unit 10. The optical modulation unit 12 outputs an optical signal generated by optical modulation to the first light splitting unit 13. That is, an output end of the optical modulation unit 12 is connected with an input end of the first light splitting unit 13 via an optical cable.

The first light splitting unit 13 splits the optical signal input from the optical modulation unit 12 and outputs the split optical signals to the multiple spatial optical communication units 14. That is, the first light splitting unit 13 has one input end and multiple output ends, each of the output ends being connected with a transmit port of the corresponding spatial optical communication unit 14 via an optical cable.

The multiple spatial optical communication units 14 are optical antennas that are distributed across different locations on the Earth and installed pointing to the second communication device 2. The multiple spatial optical communication units 14 convert optical signals input to their transmit ports to optical wireless signals and transmit them. The multiple spatial optical communication units 14 meanwhile convert received optical wireless signals to optical signals and output them from their receive ports. The transmit port of each spatial optical communication unit 14 is connected with the corresponding output end of the first light splitting unit 13 via an optical cable, and the receive port is connected with the corresponding input end of the first light coupling unit 15 via an optical cable.

That is, the multiple spatial optical communication units 14 respectively transmit optical signals input from the first light splitting unit 13 to the second communication device 2 across space. The multiple spatial optical communication units 14 also respectively receive optical signals transmitted from the second communication device 2 across space and outputs them to the first light coupling unit 15.

The first light coupling unit 15 couples optical signals input from the multiple spatial optical communication units 14 and outputs the coupled optical signal to the optical demodulation unit 17. That is, the first light coupling unit 15 has multiple input ends and one output end, the output end being connected with the optical demodulation unit 17 via an optical cable.

The receiving-side oscillating light output unit 16 outputs oscillating light to the optical demodulation unit 17. That is, an output end of the receiving-side oscillating light output unit 16 is connected with an input end of the optical demodulation unit 17 via an optical cable.

The optical demodulation unit 17 demodulates the optical signal input from the first light coupling unit 15 based on the oscillating light input from the receiving-side oscillating light output unit 16 to generate an electric signal. The optical demodulation unit 17 outputs the generated electric signal to the signal input unit 18. An output end of the optical demodulation unit 17 is connected with an input end of the signal input unit 18 via an electric cable.

The signal input unit 18 receives the signal from the optical demodulation unit 17.

Figure 3:
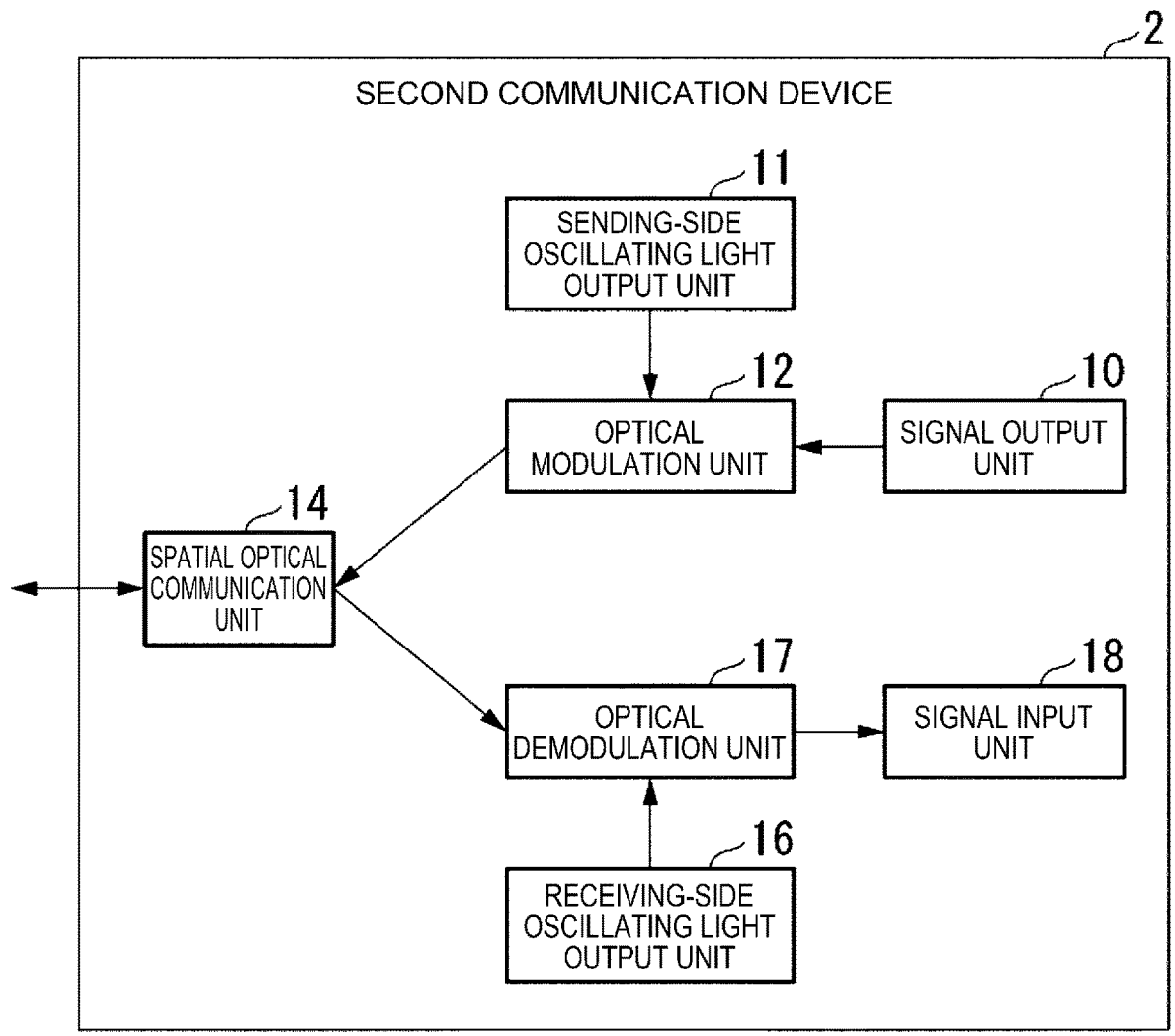
FIG. 3 shows a configuration of a second communication device according to the first embodiment.

FIG. 3 shows a configuration of the second communication device 2 according to the first embodiment.

The second communication device 2 includes at least a signal output unit 10, a sending-side oscillating light output unit 11, an optical modulation unit 12, a spatial optical communication unit 14, a receiving-side oscillating light output unit 16, an optical demodulation unit 17, and a signal input unit 18. That is, unlike the first communication device 1, it does not have to include multiple spatial optical communication units 14 and also does not have to include the first light splitting unit 13 and the first light coupling unit 15.

<<Structure of the Spatial Optical Communication Unit>>

Figure 4:
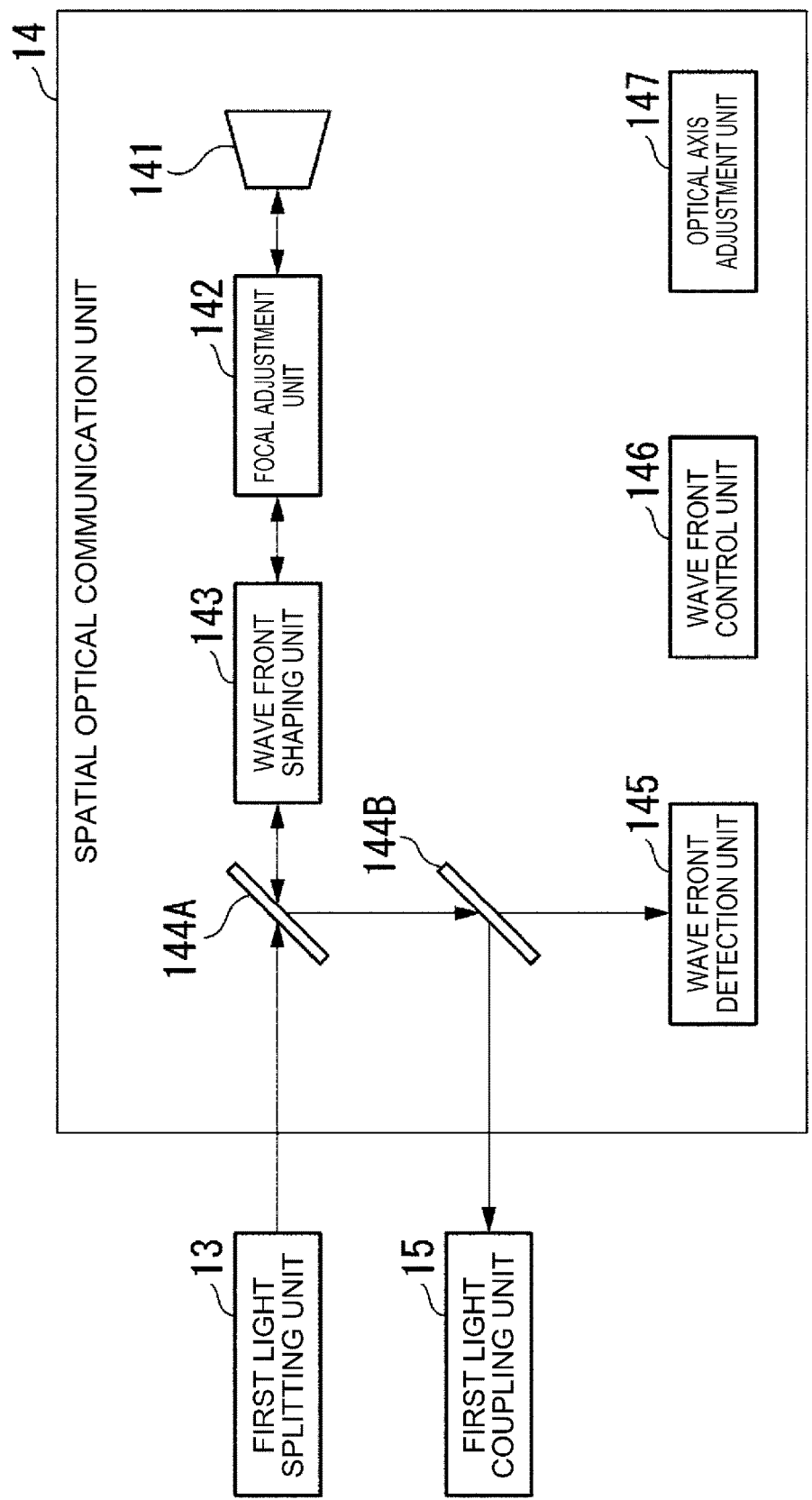
FIG. 4 is an example configuration of a spatial optical communication unit according to the first embodiment.

FIG. 4 is an example configuration of the spatial optical communication unit 14 according to the first embodiment.

The configuration of the spatial optical communication units 14 provided in the first communication device 1 and the second communication device 2 is now described.

The spatial optical communication unit 14 includes an antenna 141, a focal adjustment unit 142, a wave front shaping unit 143, a half mirror 144A, a half mirror 144B, a wave front detection unit 145, a wave front control unit 146, and an optical axis adjustment unit 147.

The antenna 141 makes a received optical wireless signal incident on the focal adjustment unit 142. The antenna 141 also transmits an optical wireless signal incident from the focal adjustment unit 142 to the other party of communication. The antenna 141 consists of multiple mirrors.

The focal adjustment unit 142 adjusts a focal point of an optical wireless signal incident from the antenna 141 and the wave front shaping unit 143 based on control by the wave front control unit 146. The focal adjustment unit 142 also makes the optical wireless signal entering from the wave front shaping unit 143 incident on the antenna 141, and makes an optical wireless signal entering from the antenna 141 incident on the wave front shaping unit 143.

The wave front shaping unit 143 corrects a wave front of an optical wireless signal incident from the half mirror 144A and the focal adjustment unit 142 based on control by the wave front control unit 146. The wave front shaping unit 143 also makes an optical wireless signal entering from the focal adjustment unit 142 incident on the half mirror 144A and makes an optical wireless signal entering from the half mirror 144A incident on the focal adjustment unit 142. The wave front shaping unit 143 can be configured as a deformable mirror, for example.

The half mirror 144A reflects part of the optical wireless signal incident from the wave front shaping unit 143. The half mirror 144A is disposed such that the reflected light is incident on the half mirror 144B. The half mirror 144A also transmits part of the optical wireless signal incident from the first light splitting unit 13 and makes it incident on the wave front shaping unit 143. The half mirror 144B reflects part of the optical wireless signal incident from the half mirror 144A and makes it incident on the first light coupling unit 15. It also transmits part of the optical wireless signal incident from the half mirror 144A and makes it incident on the wave front detection unit 145. The wave front detection unit 145 detects the wave front of the optical wireless signal incident from the half mirror 144B. The wave front control unit 146 controls the focal adjustment unit 142, the wave front shaping unit 143 and the optical axis adjustment unit 147 based on the wave front detected by the wave front detection unit 145. The optical axis adjustment unit 147 adjusts an optical axis of the optical wireless signal based on control by the wave front control unit 146. The optical axis adjustment unit 147 adjusts the optical axis by adjusting the angles of components constituting the first communication device 1, for example.

When an optical wireless signal is input to the transmit port of the spatial optical communication unit 14, the optical wireless signal is incident on the half mirror 144A and part of the optical wireless signal passes through the half mirror 144A to be incident on the wave front shaping unit 143. The wave front of the optical wireless signal is shaped by the wave front shaping unit 143 and the signal is incident on the focal adjustment unit 142. Then, the optical wireless signal is incident on the antenna 141 and is transmitted to the second communication device 2.

When the antenna 141 of the spatial optical communication unit 14 has received an optical wireless signal, the optical wireless signal is then incident on the focal adjustment unit 142 and then on the wave front shaping unit 143. After the optical wireless signal is incident on the wave front shaping unit 143, the wave front thereof is shaped and the signal is incident on the half mirror 144A. Part of the optical wireless signal incident on the half mirror 144A passes through it to be incident on the half mirror 144B. Part of the optical wireless signal incident on the half mirror 144B passes through it to be incident on the wave front detection unit 145, where its wave front is detected. Part of the optical wireless signal incident on the half mirror 144B is reflected to be incident on the first light coupling unit 15.

The spatial optical communication unit 14 included in the second communication device 2 may have a simpler configuration than the spatial optical communication units 14 included in the first communication device 1 has. For example, the spatial optical communication unit 14 of the second communication device 2 may include the antenna 141, the half mirror 144A and the half mirror 144B and not include the focal adjustment unit 142, the wave front shaping unit 143, the wave front detection unit 145, the wave front control unit 146, and the optical axis adjustment unit 147.

In the spatial optical communication unit 14 included in the second communication device 2, the half mirror 144A transmits part of an optical wireless signal incident from the optical modulation unit 12 and makes it incident on the wave front shaping unit 143, while the half mirror 144B reflects part of the optical wireless signal incident from the half mirror 144A and makes it incident on the optical demodulation unit 17. That is, the second communication device 2 is configured such that the first light splitting unit 13 of FIG. 4 is replaced with the optical modulation unit 12 and the first light coupling unit 15 is replaced with the optical demodulation unit 17.

<<Operation of Communication Devices>>

Next, the operation of the communication devices according to this embodiment is described.

Figure 5:
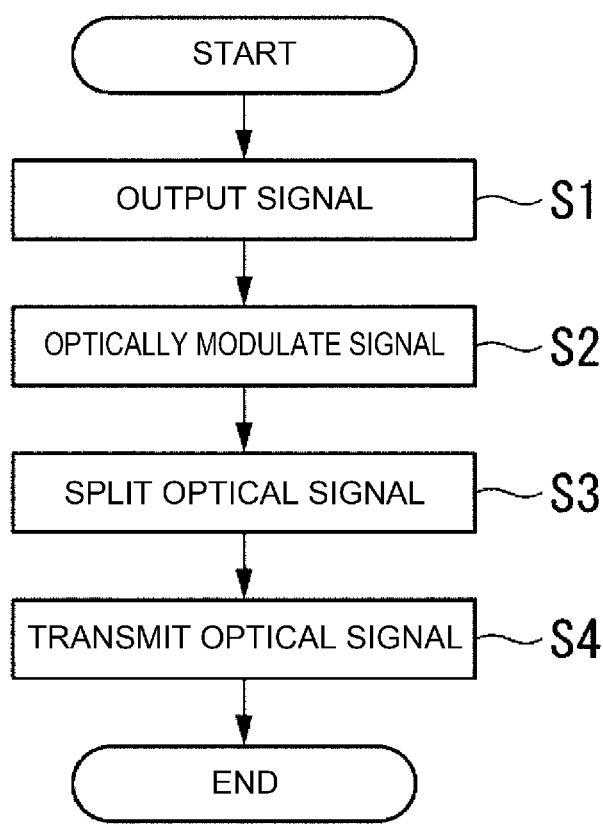
FIG. 5 is a flowchart showing a signal transmitting operation of the first communication device according to the first embodiment.

FIG. 5 is a flowchart showing a signal transmitting operation of the first communication device 1 according to the first embodiment.

First, the signal output unit 10 outputs a signal to the optical modulation unit 12 (step S1). The optical modulation unit 12 modulates oscillating light input from the sending-side oscillating light output unit 11 with the signal input from the signal output unit 10 at step S1 to generate an optical signal. The optical modulation unit 12 outputs the generated optical signal to the first light splitting unit 13 (step S2). The first light splitting unit 13 splits the optical signal that was input from the optical modulation unit 12 at step S2 and outputs split optical signals to the multiple spatial optical communication units 14 (step S3). The spatial optical communication units 14 transmit the optical signals input from the first light splitting unit 13 to the second communication device 2 across space (step S4).

Figure 6:
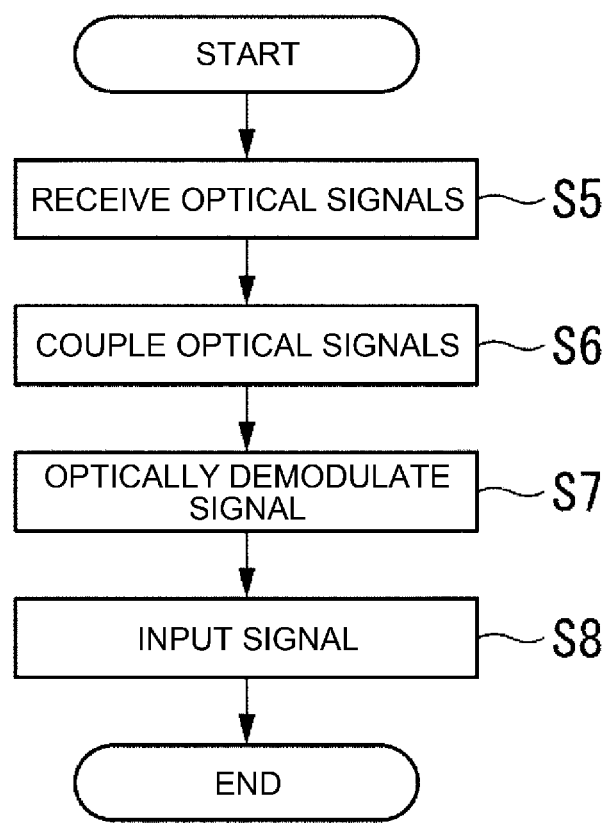
FIG. 6 is a flowchart illustrating a signal receiving operation of the first communication device according to the first embodiment.

FIG. 6 is a flowchart illustrating a signal receiving operation of the first communication device 1 according to the first embodiment.

First, the spatial optical communication units 14 each receive an optical signal transmitted by the second communication device 2 across space and output it to the first light coupling unit 15 (step S5). The first light coupling unit 15 couples the optical signals that were input from the spatial optical communication units 14 at step S5 and outputs the coupled optical signal to the optical demodulation unit 17 (step S6). The optical demodulation unit 17 optically demodulates the optical signal that was input from the first light coupling unit 15 at step S6 with oscillating light being input from the receiving-side oscillating light output unit 16 to extract the signal, and outputs it to the signal input unit 18 (step S7). The signal input unit 18 receives the input of the signal from the optical demodulation unit 17 (step S8).

<<Effects>>

As described above, according to the first embodiment, the first communication device 1 splits a single optical signal and transmits the split optical signals from the multiple spatial optical communication units 14. The first communication device 1 also couples optical signals received from the second communication device 2 and optically demodulates it with a single beam of oscillating light, thus receiving the signal. By doing so, the first communication device 1 according to this embodiment can even out phase fluctuations of oscillating light, compared to an arrangement that generates an optical signal by performing modulation and demodulation of a signal for each spatial optical communication unit 14. The first communication device 1 can thereby eliminate change in phase that occurs in optical modulation and demodulation of multiple optical signals to be transmitted by multiple spatial optical communication units 14.

Second Embodiment

Figure 7:
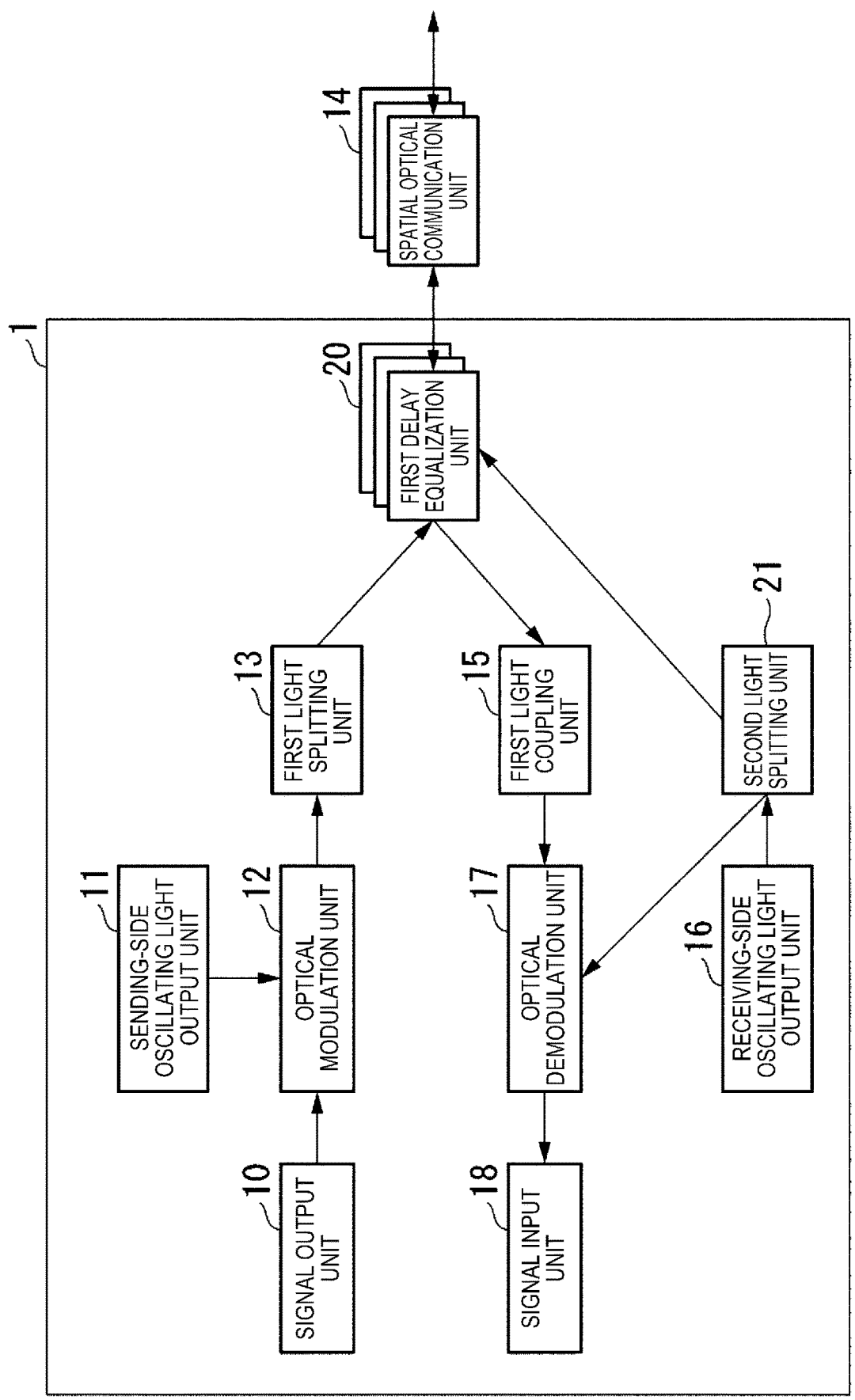
FIG. 7 shows a configuration of the first communication device according to a second embodiment.

FIG. 7 shows a configuration of the first communication device 1 according to a second embodiment.

The first communication device 1 according to the second embodiment includes first delay equalization units 20 (a delay equalizer) as many as the spatial optical communication units 14 and a second light splitting unit, in addition to the configuration of the first embodiment. That is, the first communication device 1 has multiple first delay equalization units 20 corresponding to the respective ones of the multiple spatial optical communication units 14.

Each of the first delay equalization units 20 is connected with the first light splitting unit 13, the first light coupling unit 15, the second light splitting unit 21, and the corresponding spatial optical communication unit 14. The first delay equalization unit 20 controls the phase of optical signals input from the first light splitting unit 13 and the corresponding spatial optical communication unit 14 based on an optical signal input from the second light splitting unit 21 and outputs them.

The first delay equalization unit 20 controls the phase of an optical signal input from the first light splitting unit 13 based on an optical signal input from the corresponding spatial optical communication unit 14 and outputs the signal to the spatial optical communication unit 14. The first delay equalization unit 20 also receives input of an optical signal from the corresponding spatial optical communication unit 14, controls its phase and outputs the signal to the first light coupling unit 15.

The second light splitting unit 21 splits oscillating light input from the receiving-side oscillating light output unit 16 and outputs the split beams of oscillating light to the first delay equalization unit 20 and the optical demodulation unit 17.

The first light splitting unit 13 splits an optical signal input from the optical modulation unit 12 and outputs the split optical signals to the first delay equalization units 20. The spatial optical communication units 14 transmit the optical signals input from the first delay equalization units 20 to the second communication device 2 across space. The spatial optical communication units 14 also output optical signals that are received across space to the first delay equalization units 20. The first light coupling unit 15 couples the optical signals input from the first delay equalization units 20 and outputs the coupled optical signal to the optical demodulation unit 17. The receiving-side oscillating light output unit 16 outputs oscillating light to the second light splitting unit 21. The optical demodulation unit 17 demodulates the optical signal input from the first light coupling unit 15 with the oscillating light input from the second light splitting unit 21.

<<First Delay Equalization Unit>>

Figure 8:
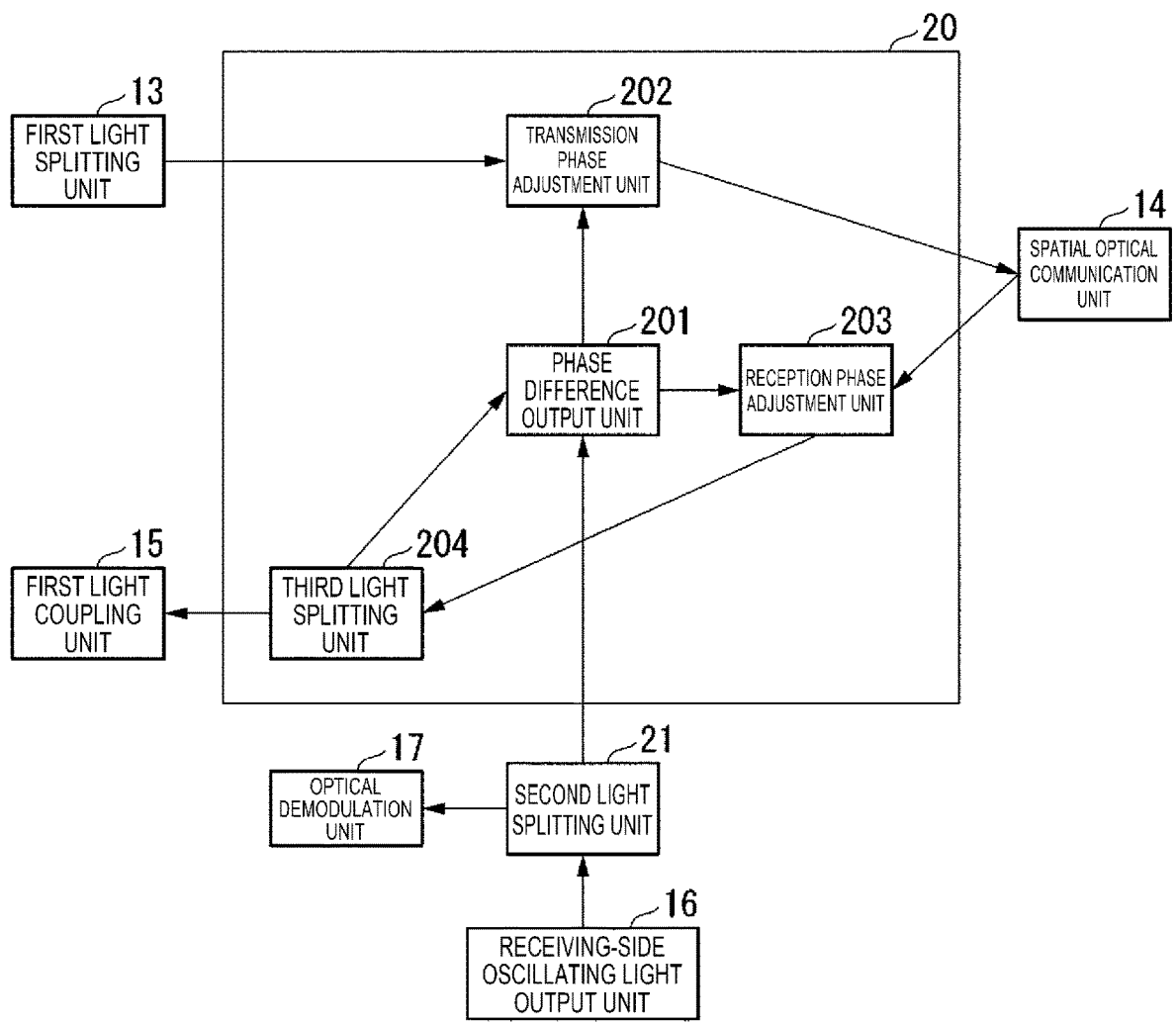
FIG. 8 shows a configuration of a first delay equalization unit according to the second embodiment.

FIG. 8 shows a configuration of the first delay equalization unit 20 according to the second embodiment.

The first delay equalization unit 20 includes a phase difference output unit 201, a transmission phase adjustment unit 202, a reception phase adjustment unit 203, and a third light splitting unit 204.

The phase difference output unit 201 is connected with the transmission phase adjustment unit 202, the reception phase adjustment unit 203, the third light splitting unit 204 and the second light splitting unit 21. The transmission phase adjustment unit 202 is connected with the first light splitting unit 13, the phase difference output unit and the corresponding spatial optical communication unit 14. The reception phase adjustment unit 203 is connected with the phase difference output unit 201, the third light splitting unit 204 and the corresponding spatial optical communication unit 14. The third light splitting unit 204 is connected with the phase difference output unit 201, the reception phase adjustment unit 203 and the first light coupling unit 15.

The phase difference output unit 201 functions as an optical phase detector and obtains a phase difference between the oscillating light input from the second light splitting unit 21 and the optical signal input from the third light splitting unit 204. The phase difference output unit 201 also outputs a signal indicating the computed phase difference to the transmission phase adjustment unit 202 and the reception phase adjustment unit 203. A phase difference θ computed here is $0 \leq \theta < 2\pi$. The transmission phase adjustment unit 202 adjusts the phase of the optical signal input from the first light splitting unit 13 based on data on phase difference which is input from the phase difference output unit 201. The transmission phase adjustment unit 202 also outputs a phase-modulated optical signal to the spatial optical communication unit 14. The reception phase adjustment unit 203 performs phase modulation such that the phase of the optical signal input from the spatial optical communication unit 14 is advanced by the phase difference data input from the phase difference output unit 201. The reception phase adjustment unit 203 also outputs the phase-modulated optical signal to the third light splitting unit 204. The third light splitting unit 204 splits the optical signal input from the reception phase adjustment unit 203 and outputs the split optical signals to the phase difference output unit 201 and the first light coupling unit 15.

Figure 9:
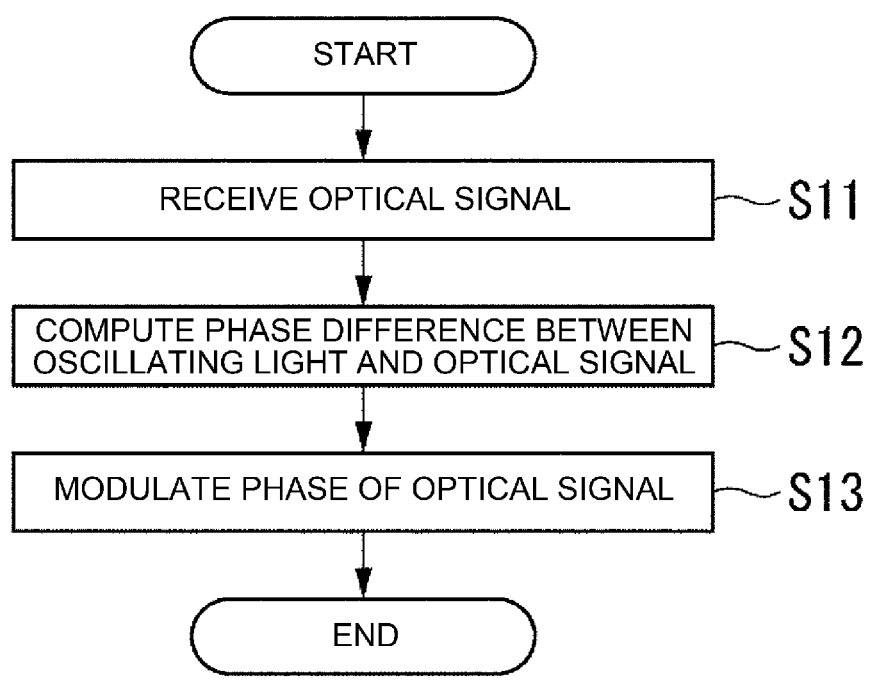
FIG. 9 is a flowchart illustrating the operation of the first delay equalization unit according to the second embodiment.

FIG. 9 is a flowchart illustrating the operation of the first delay equalization unit 20 according to the second embodiment.

To start with, a spatial optical communication unit 14 receives an optical signal (step S11). Then, the received optical signal is input to the phase difference output unit 201 via the reception phase adjustment unit 203 and the third light splitting unit 204. The phase difference output unit 201 subtracts the phase of the optical signal input from the third light splitting unit 204 from the phase of the oscillating light input from the second light splitting unit 21 to compute the phase difference between the oscillating light and the optical signal (step S12). The phase difference output unit 201 outputs data on the computed phase difference to the transmission phase adjustment unit 202 and the reception phase adjustment unit 203. The transmission phase adjustment unit 202 and the reception phase adjustment unit 203 adjust the phase of the input optical signal based on the input data on the phase difference (step S13).

Phase adjustment by the first delay equalization unit according to the second embodiment is now described by taking an example of signals received by two spatial optical communication units 14.

For example, assume that the phase difference between a received signal acquired by the phase difference output unit 201 of one first delay equalization unit 20 and receiving-side oscillating light is $\theta_1$, and the phase difference between a received signal acquired by the phase difference output unit 201 of another first delay equalization unit 20 and the receiving-side oscillating light is $\theta_2$. The phase difference is adjusted in the transmission phase adjustment unit 202 and the reception phase adjustment unit 203. That is, the transmission phase adjustment unit 202 delays the optical signal input from the first light splitting unit 13 based on the phase difference obtained by the phase difference output unit. The reception phase adjustment unit 203 delays an optical signal input from the spatial optical communication unit 14 based on the phase difference obtained by the phase difference output unit.

The phases of optical signals that are wirelessly received by the spatial optical communication units 14 are adjusted by $\theta_1$ and $\theta_2$ at the reception phase adjustment unit 203, respectively, thereby being aligned with the oscillating light that is output by the receiving-side oscillating light output unit 16. Consequently, optical signals finally output by the two first delay equalization units 20 all have an aligned phase.

The phases of optical signals to be wirelessly transmitted by the spatial optical communication units 14 are adjusted by $\theta_1$ and $\theta_2$ at the transmission phase adjustment unit 202, respectively, before transmission. Thus, the phase of an optical signal that is output from the transmission phase adjustment unit 202 to each spatial optical communication unit 14 is different from each other. Meanwhile, by the time when the optical signals output by the transmission phase adjustment units 202 reach the second communication device 2 through the spatial optical communication units 14, their phases become misaligned by the same phases $\theta_1$ and $\theta_2$, respectively, as the optical signals that were received by the first communication device 1. Thus, the phases of the respective optical signals transmitted by the two spatial optical communication units 14 will have been aligned when the signals reach the second communication device 2.

<<Effects>>

As described above, according to the second embodiment, the phase difference between each of multiple optical signals received by the spatial optical communication units 14 and a single beam of oscillating light being output by the receiving-side oscillating light output unit 16 is computed by the corresponding first delay equalization unit 20, and with the computed phase difference, optical signals that are transmitted and received by the corresponding spatial optical communication unit 14 are phase-modulated. This makes the phases of multiple optical signals aligned with reference to the phase of a single beam of oscillating light, eliminating misalignment of phases that occurs inside the spatial optical communication units 14. Thus, the phases of optical signals transmitted by the respective spatial optical communication units 14 can be brought to closer values to one another.

Third Embodiment

Figure 10:
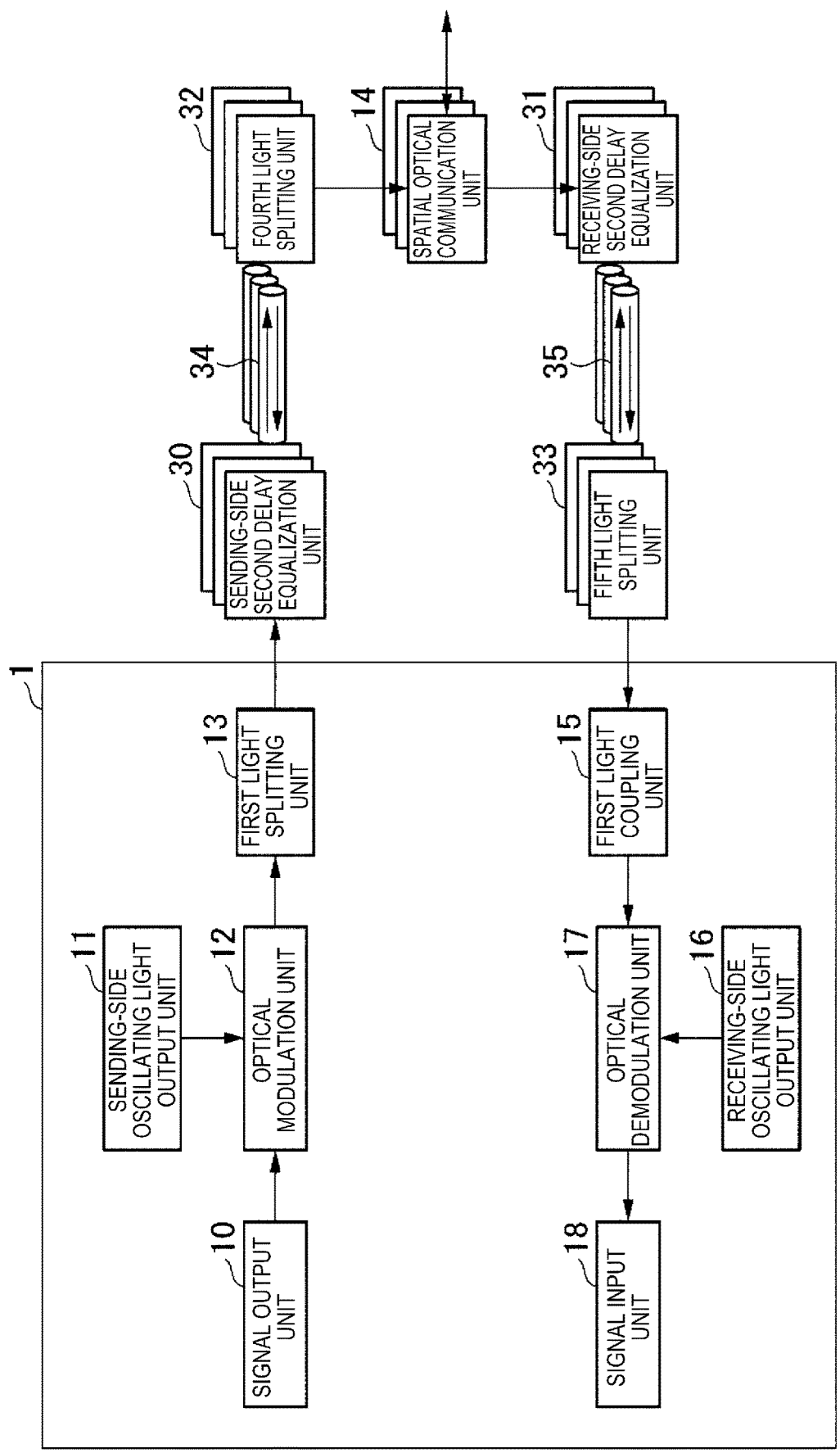
FIG. 10 shows a configuration of the first communication device according to a third embodiment.

FIG. 10 shows a configuration of the first communication device 1 according to a third embodiment.

The first communication device 1 according to the third embodiment includes sending-side second delay equalization units 30, receiving-side second delay equalization units 31, fourth light splitting units 32, fifth light splitting units 33 as many as the spatial optical communication units 14, in addition to the configuration of the first embodiment. Further, first path-length unknown sections 34 are present between the sending-side second delay equalization units 30 and the fourth light splitting units 32, and second path-length unknown sections 35 are present between the receiving-side second delay equalization units 31 and the fifth light splitting units 33. The first path-length unknown sections 34 and the second path-length unknown sections 35 are paths in which an error occurs in the length of a component such as optical fiber and an exact path length is not known.

The sending-side second delay equalization units 30 are connected with the first light splitting unit and connected with the corresponding fourth light splitting units via the first path-length unknown sections 34. The receiving-side second delay equalization units 31 are connected with the corresponding spatial optical communication units 14 and connected with the corresponding fifth light splitting units 33 via the second path-length unknown sections 35. The fourth light splitting units 32 are connected with the corresponding spatial optical communication units 14 and connected with the corresponding sending-side second delay equalization units 30 via the first path-length unknown sections 34. The fifth light splitting units 33 are connected with the first light coupling unit 15 and connected with the corresponding receiving-side second delay equalization units 31 via the second path-length unknown sections 35.

Each sending-side second delay equalization unit 30 changes the phase of an optical signal input from the first light splitting unit 13 based on the phases of an optical signal input from the first light splitting unit 13 and an optical signal input from the fourth light splitting unit 32. Each receiving-side second delay equalization unit 31 changes the phase of an optical signal which is input from the spatial optical communication unit 14 based on the phase of an optical signal input from the fourth light splitting unit 32, based on the phases of optical signals input from the spatial optical communication unit 14 and the fifth light splitting unit. Each fourth light splitting unit 32 splits an optical signal which is input from the sending-side second delay equalization unit 30 via the first path-length unknown section 34, and outputs the split optical signals to the sending-side second delay equalization unit 30 and the spatial optical communication unit 14. Each fifth light splitting unit 33 splits an optical signal which is input from the receiving-side second delay equalization unit 31 via the second path-length unknown section 35, and outputs the split optical signals to the receiving-side second delay equalization unit 31 and the first light coupling unit 15.

<<Second Delay Equalization Unit>>

Figure 11:
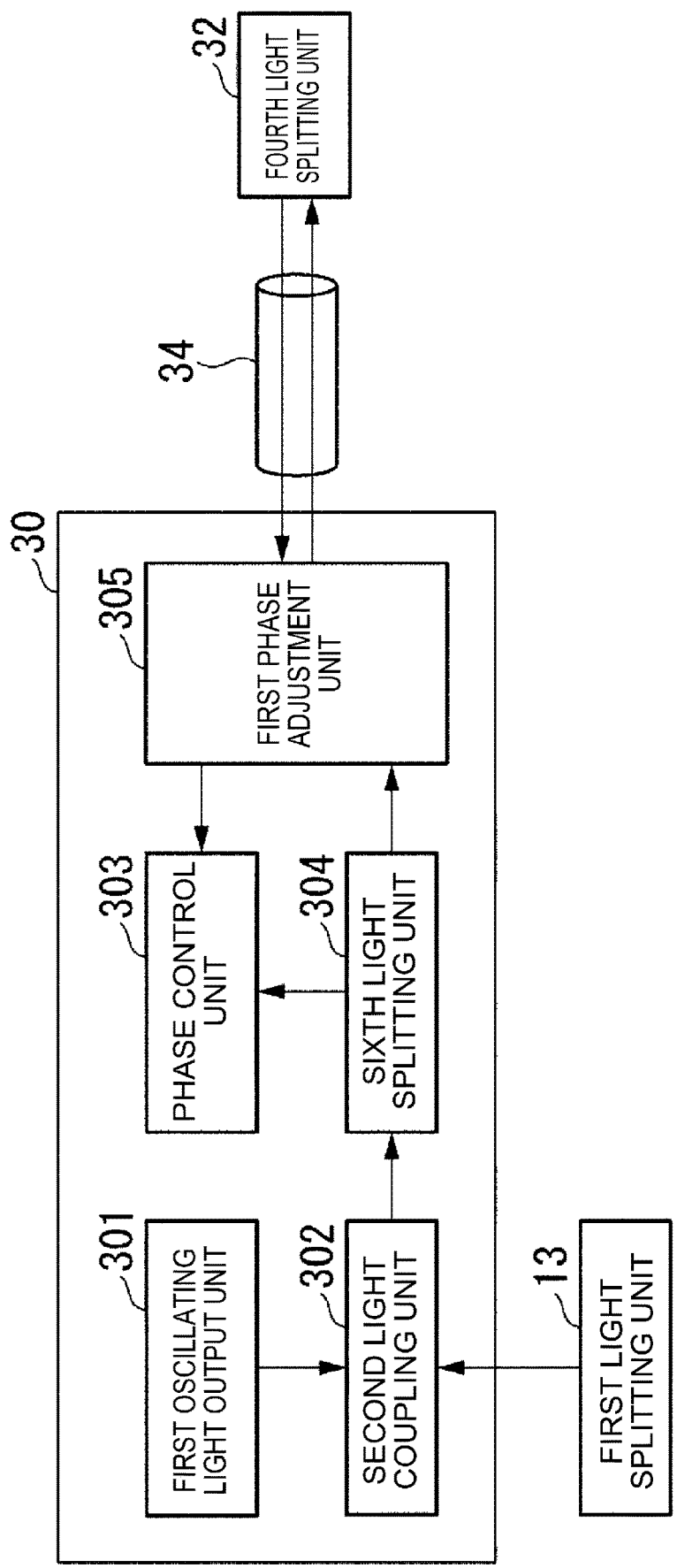
FIG. 11 shows a configuration of a sending-side second delay equalization unit according to the third embodiment.

FIG. 11 shows a configuration of the sending-side second delay equalization unit 30 according to the third embodiment.

The sending-side second delay equalization unit 30 includes a first oscillating light output unit 301, a second light coupling unit 302, a phase control unit 303, a sixth light splitting unit 304, and a first phase adjustment unit 305.

The first oscillating light output unit 301 is connected with the second light coupling unit 302. The second light coupling unit 302 is connected with the first light splitting unit and the sixth light splitting unit 304. The phase control unit 303 is connected with the sixth light splitting unit 304 and the first phase adjustment unit 305. The sixth light splitting unit 304 is connected with the second light coupling unit 302 and the phase control unit 303. The first phase adjustment unit 305 is connected with the phase control unit 303 and the sixth light splitting unit 304 and is connected with the fourth light splitting unit 32 via the first path-length unknown section 34.

The first oscillating light output unit 301 outputs oscillating light to the second light coupling unit 302. A wavelength of oscillating light that is output at this point is twice the wavelength of optical signals used in the first communication device 1. The second light coupling unit 302 couples light input from the first light splitting unit 13 and light input from the first oscillating light output unit 301 and outputs the coupled light to the sixth light splitting unit 304. The phase control unit 303 controls the first phase adjustment unit 305 based on the phase of optical signals which are input from the sixth light splitting unit 304 and the first phase adjustment unit 305. The sixth light splitting unit 304 splits the optical signal input from the second light coupling unit 302 and outputs the split optical signals to the phase control unit 303 and the first phase adjustment unit 305. The first phase adjustment unit 305 phase-modulates optical signals which are input from the sixth light splitting unit 304 and the fourth light splitting unit 32 based on control by the phase control unit 303. The first phase adjustment unit 305 also outputs the optical signal input from the sixth light splitting unit 304 to the fourth light splitting unit 32 and outputs the optical signal input from the fourth light splitting unit 32 to the first phase adjustment unit 305.

The receiving-side second delay equalization unit 31 has the same configuration as the sending-side second delay equalization unit 30. The second light coupling unit 302 of the receiving-side second delay equalization unit 31 is connected with the corresponding spatial optical communication unit 14, and the first phase adjustment unit 305 is connected with the corresponding fifth light splitting unit 33 via the second path-length unknown section 35.

<<Operation of Phase Control Unit 303>>

There are two routes of propagation for oscillating light that is output from the first oscillating light output unit 301 and input to phase control unit 303. In a first route, the light passes through the second light coupling unit 302 and the sixth light splitting unit 304 to be input to the phase control unit 303. In a second route, the light proceeds in the order of the second light coupling unit 302, the sixth light splitting unit 304, the first phase adjustment unit 305, the first path-length unknown section 34, the fourth light splitting unit 32, the first path-length unknown section 34, and the first phase adjustment unit 305, to be input to the phase control unit 303. The latter route involves a longer path length for the oscillating light to propagate because of a round trip through the first path-length unknown section 34. The phase difference of beams of oscillating light that have traveled on the two routes is represented by Expression (1):

[Math. 1]

$$\frac{2\pi}{\lambda_c} \times 2\delta \quad (1)$$

Wherein $\lambda_c$ is the wavelength of the oscillating light, $\pi$ is the ratio of a circle's circumference to its diameter, and $\delta$ is the path length of the first path-length unknown section 34. The phase control unit 303 measures the phase difference represented by Expression (1) and controls the first phase adjustment unit 305. The first phase adjustment unit 305 adjusts phases such that the phase difference measured by the phase control unit 303 is $(2n+1)\pi$ (n being an integer). That is to say, phases are adjusted so that the respective beams of oscillating light traveling on the two routes have opposite phases.

The phase difference between the beams of oscillating light that have traveled the two routes respectively after phase adjustment is represented by Expression (2):

[Math. 2]

$$\frac{2\pi}{\lambda_c} \times 2\Delta = (2n+1)\pi \quad (2)$$

Wherein $2\Delta$ is an apparent path difference between the two routes on which the beams of oscillating light after phase adjustment propagate. An optical signal is transmitted to the second communication device 2 through the route: the first light splitting unit 13, the second light coupling unit 302, the sixth light splitting unit 304, the first phase adjustment unit 305, the first path-length unknown section 34, the fourth light splitting unit 32, and the spatial optical communication unit 14. For the same optical signal, the difference between the phase at the second light coupling unit 302 and the phase at the fourth light splitting unit 32 is represented by Expression (3):

[Math. 3]

$$\frac{2\pi}{\lambda} \times \Delta = \frac{2\pi}{\frac{\lambda_c}{2}} \times \Delta = (2n+1)\pi \quad (3)$$

The wavelength $\lambda_c$ of the oscillating light is set to twice the wavelength $\lambda$ of the optical signal. Accordingly, the phase of an optical signal that is output through the sending-side second delay equalization unit 30 after phase adjustment is the opposite of the phase of the input optical signal and is not dependent on the path length of the first path-length unknown section 34.

Figure 12:
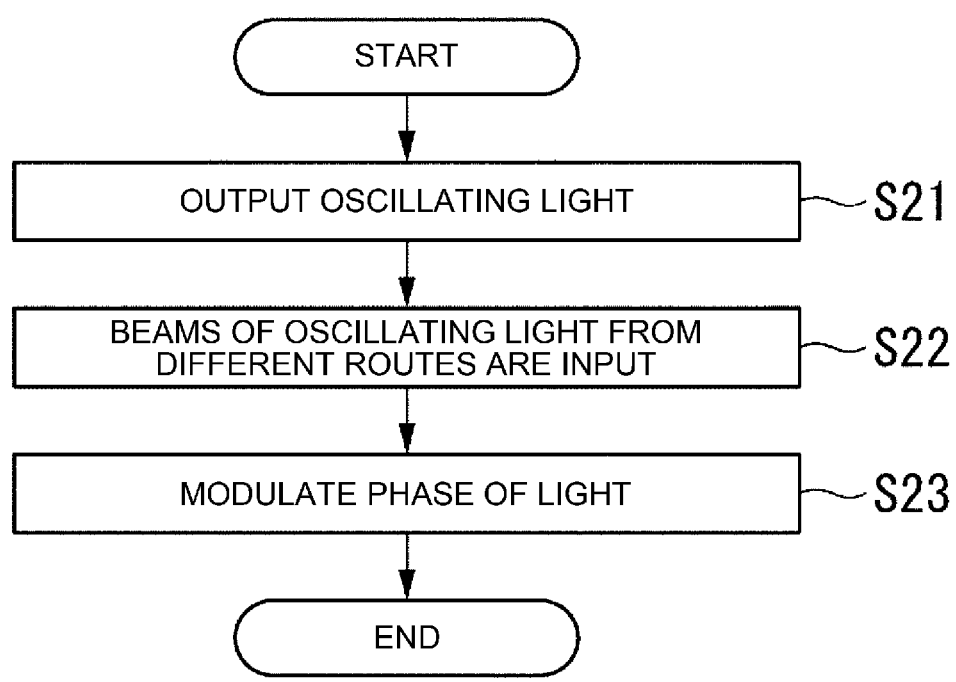
FIG. 12 is a flowchart illustrating the operation of the sending-side second delay equalization unit according to the third embodiment.

FIG. 12 is a flowchart illustrating the operation of the sending-side second delay equalization unit 30 according to the third embodiment.

First, the first oscillating light output unit 301 outputs oscillating light (step S21). Beams of the oscillating light are input to the phase control unit 303 through the two routes: the route through the first path-length unknown section 34 and the route not through it (step S22). The phase control unit 303 controls the first phase adjustment unit 305 such that the beams of light that have propagated through the two routes have the opposite phases to each other, and the first phase adjustment unit 305 adjusts the phase of the light being input based on control by the phase control unit 303 (step S23). Subsequently, when the optical signal is output from the first light splitting unit 13 to the second light coupling unit 302, an optical signal of a phase that is not dependent on the first path-length unknown section 34 can be obtained at the fourth light splitting unit 32.

Description has been made thus far with the sending-side second delay equalization unit 30, the first path-length unknown section 34 and the fourth light splitting unit 32. The configurations and operations of the receiving-side second delay equalization unit 31, the second path-length unknown section 35 and the fifth light splitting unit 33 are also similar to those of the sending-side second delay equalization unit 30, the first path-length unknown section 34 and the fourth light splitting unit 32.

<<Effects>>

As described above, according to the third embodiment, the phase of an optical signal which is output from the fifth light splitting unit 33 can be made the opposite of the phase of an optical signal input to the sending-side second delay equalization unit 30 regardless of the path lengths of the first path-length unknown section 34 and the second path-length unknown section 35. This enables alignment of phases even when there is a difference in path length between the first light splitting unit 13 and the spatial optical communication units 14 inside the first communication device 1.

Fourth Embodiment

Figure 13:
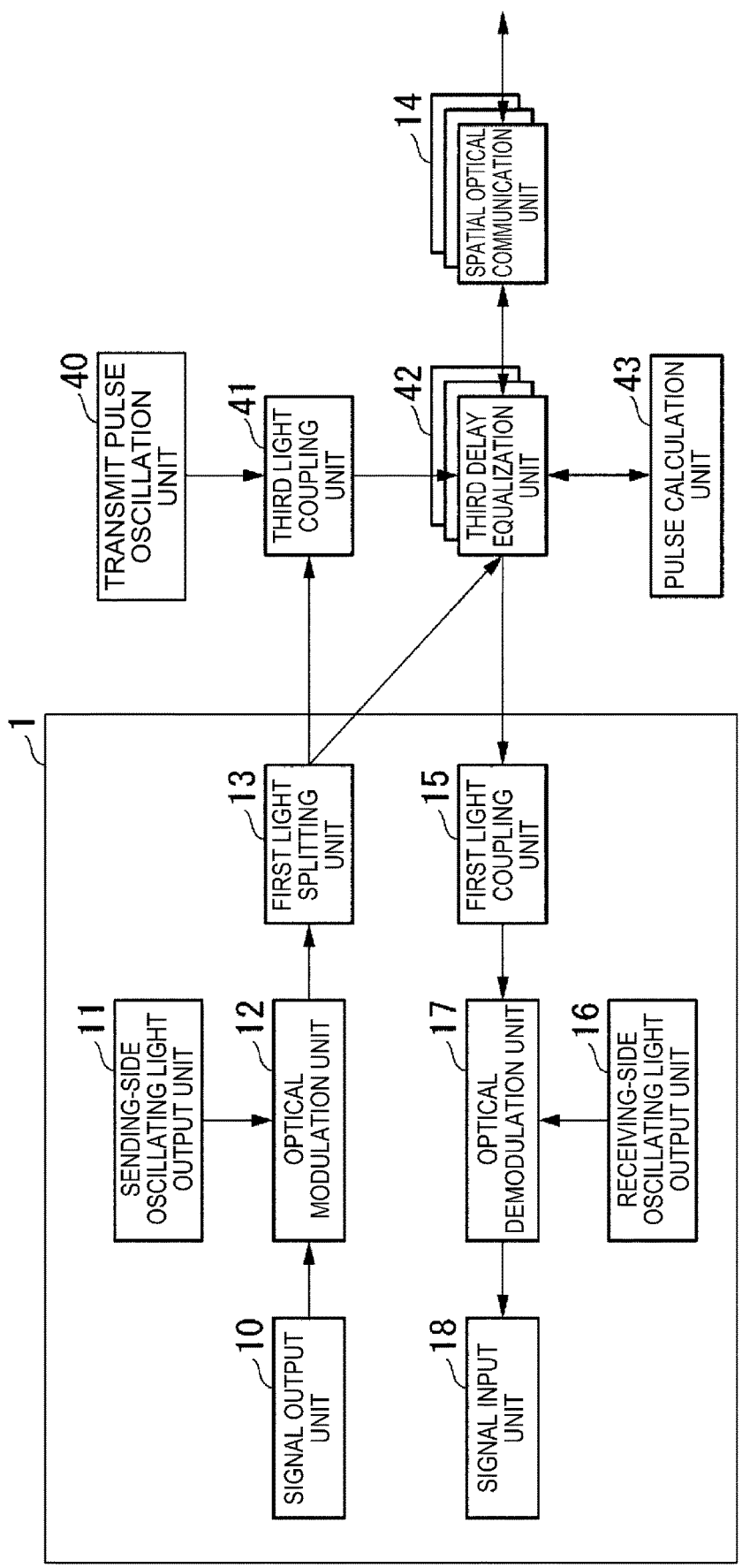
FIG. 13 shows a configuration of the first communication device according to a fourth embodiment.

FIG. 13 shows a configuration of the first communication device 1 according to a fourth embodiment.

The first communication device 1 according to the fourth embodiment includes third delay equalization units 42 as many as the spatial optical communication units 14, a transmit pulse oscillation unit 40, a third light coupling unit 41, and a pulse calculation unit 43, in addition to the configuration of the first embodiment.

The transmit pulse oscillation unit 40 is connected with the third light coupling unit 41. The third light coupling unit 41 is connected with the first light splitting unit 13, the transmit pulse oscillation unit 40 and one third delay equalization unit 42. One third delay equalization unit 42 is connected with the third light coupling unit 41, the pulse calculation unit 43, the first light coupling unit 15 and the corresponding spatial optical communication unit 14, and the other third delay equalization units 42 excluding said one is connected with the first light splitting unit 13, the pulse calculation unit 43, the first light coupling unit 15 and the corresponding spatial optical communication units 14. The pulse calculation unit 43 is connected with the third delay equalization units 42.

The transmit pulse oscillation unit 40 outputs pulse light to the third light coupling unit 41. The third light coupling unit 41 couples light input from the first light splitting unit 13 and light input from the transmit pulse oscillation unit 40 and outputs the coupled light to the one third delay equalization unit 42. The third delay equalization unit 42 adjusts the length of the path on which an optical signal propagates based on a result of the pulse calculation unit 43. It also outputs the light input from the first light splitting unit 13 or the third light coupling unit 41 to the spatial optical communication unit 14 and outputs light input from the spatial optical communication unit 14 to the pulse calculation unit 43 and the first light coupling unit 15. The pulse calculation unit 43 computes the path length over which the optical signal propagates based on an observation time of pulse light which is input from the third delay equalization unit 42, and controls the third delay equalization unit 42.

<Third Delay Equalization Unit 42>

Figure 14:
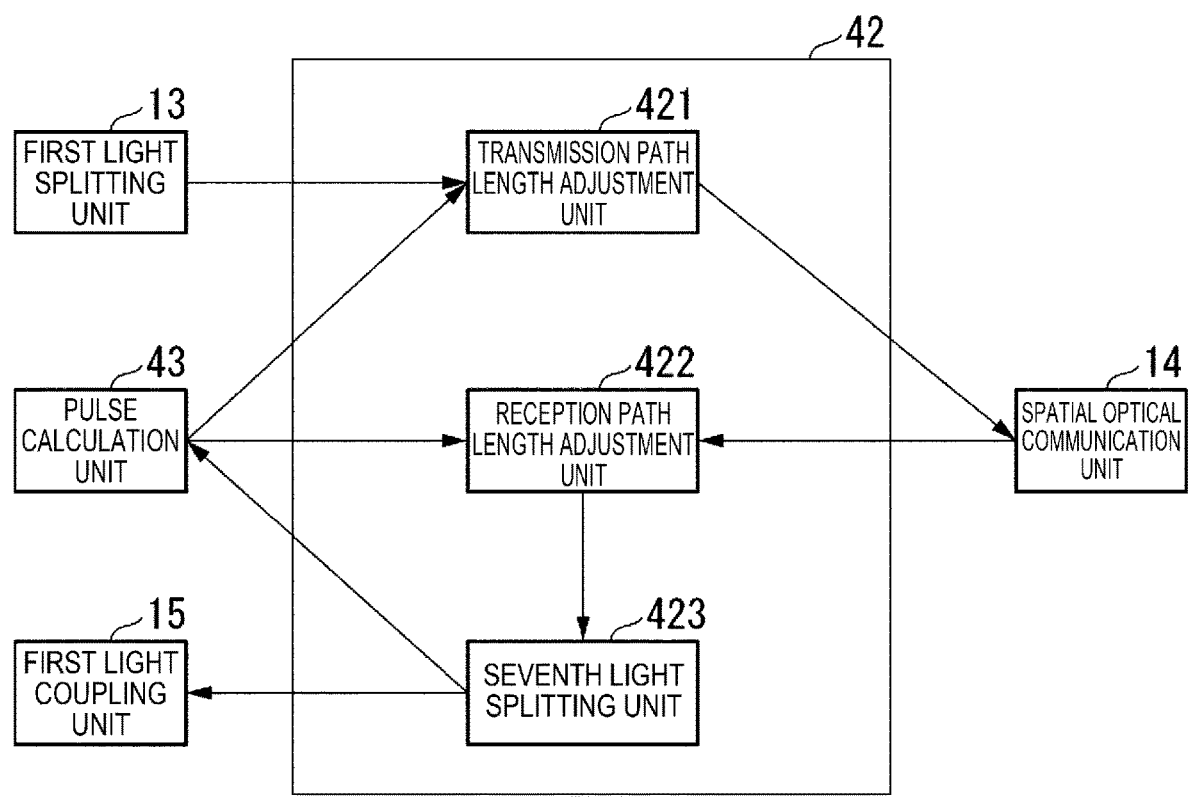
FIG. 14 shows a configuration of a third delay equalization unit according to the fourth embodiment.

FIG. 14 shows a configuration of the third delay equalization unit 42 according to the fourth embodiment.

The third delay equalization unit 42 includes a transmission path length adjustment unit 421, a reception path length adjustment unit 422, and a seventh light splitting unit 423.

The transmission path length adjustment unit 421 is connected with the first light splitting unit 13, the pulse calculation unit 43 and the corresponding spatial optical communication unit 14. The reception path length adjustment unit 422 is connected with the pulse calculation unit 43, the seventh light splitting unit 423 and the corresponding spatial optical communication unit 14. The seventh light splitting unit 423 is connected with the reception path length adjustment unit 422, the pulse calculation unit 43, and the first light coupling unit 15.

The transmission path length adjustment unit 421 changes the path length within the transmission path length adjustment unit 421 based on a calculation result of the pulse calculation unit 43. The transmission path length adjustment unit 421 also outputs an optical signal input from the first light splitting unit 13 to the spatial optical communication unit 14. The reception path length adjustment unit 422 changes the path length within the reception path length adjustment unit 422 based on a calculation result of the pulse calculation unit 43. The reception path length adjustment unit 422 also outputs an optical signal input from the spatial optical communication unit 14 to the seventh light splitting unit 423. The seventh light splitting unit 423 splits the optical signal input from the reception path length adjustment unit 422 and outputs the split optical signals to the pulse calculation unit 43 and the first light coupling unit 15.

The transmission path length adjustment unit 421 and the reception path length adjustment unit 422 have sections where optical signals propagate in space, not in optical fiber, inside them. The transmission path length adjustment unit 421 and the reception path length adjustment unit 422 change the path length by moving components that form opposite ends of those sections to change the length of the sections.

Operation of the Fourth Embodiment

Figure 15:
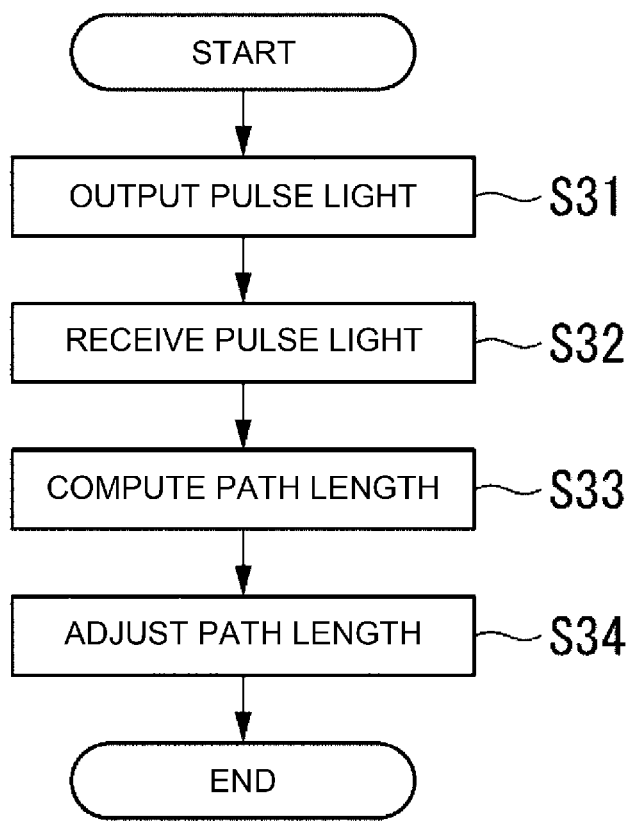
FIG. 15 is a flowchart illustrating the operation of the third delay equalization unit according to the fourth embodiment.

FIG. 15 is a flowchart illustrating the operation of the third delay equalization unit 42 according to the fourth embodiment.

First, the transmit pulse oscillation unit 40 outputs pulse light to the third light coupling unit 41 (step S31). The pulse light subsequently passes through one third delay equalization unit 42 and is transmitted to the second communication device 2 from a spatial optical communication unit 14. This pulse light is reflected at a certain point in the atmospheric layer, for example, and retuned pulse light is received by the spatial optical communication units 14 again (step S32). The returned pulse light is then input to the pulse calculation unit 43 via the third delay equalization units 42. The pulse calculation unit 43 computes the path length over which an optical signal propagates based on the observation time of the pulse light input from the third delay equalization units 42 (step S33), and controls the third delay equalization unit 42 (step S34). The transmission path length adjustment unit 421 and the reception path length adjustment unit 422 of the third delay equalization unit 42 change the path length based on a computation result of the pulse calculation unit 43.

<<Effects>>

As described above, according to the fourth embodiment, pulse light is output by one spatial optical communication unit 14, reflected and returned pulse light is received by multiple spatial optical communication units 14, the distance between the point at which the pulse light was reflected and each spatial optical communication unit 14 is computed from the difference in the time of its reception, and the path length within the third delay equalization unit 42 is changed. Thus, according to the fourth embodiment, path lengths can be matched even when the difference between a minimum path length and a maximum path length among the multiple spatial optical communication units is longer than one wavelength of an optical signal.

Fifth Embodiment

Figure 16:
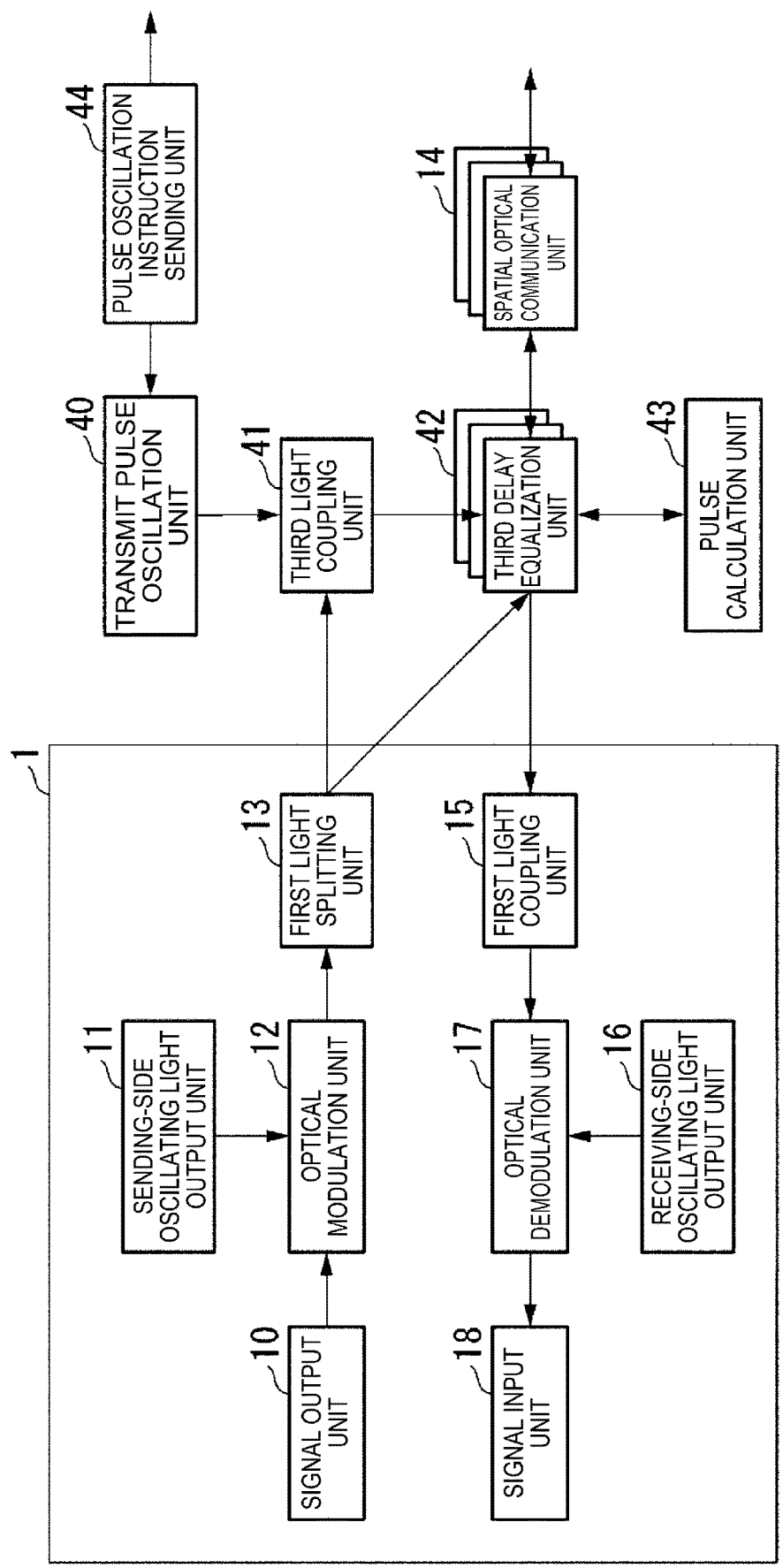
FIG. 16 shows a configuration of the first communication device according to a fifth embodiment.

FIG. 16 shows a configuration of the first communication device 1 according to a fifth embodiment.

Figure 17:
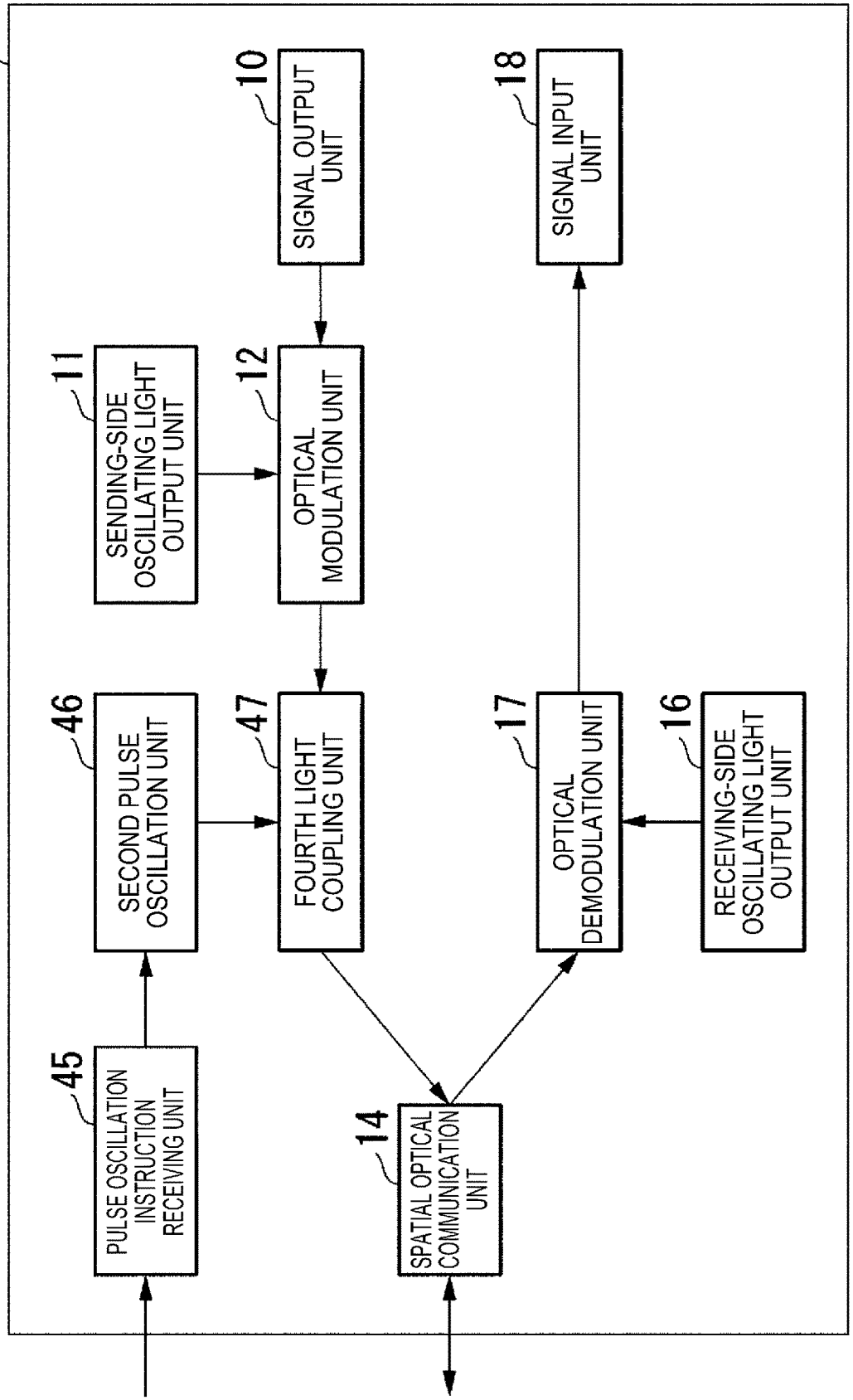
FIG. 17 shows a configuration of the second communication device according to the fifth embodiment.

FIG. 17 shows a configuration of the second communication device 2 according to the fifth embodiment.

The first communication device 1 according to the fifth embodiment includes a pulse oscillation instruction sending unit 44 (a phase adjustment request transmitter), in addition to the configuration of the first communication device 1 according to the fourth embodiment. The second communication device 2 according to the fifth embodiment further includes a pulse oscillation instruction receiving unit 45, a second pulse oscillation unit 46, and a fourth light coupling unit 47, in addition to the configuration of the second communication device 2 according to the first embodiment.

The pulse oscillation instruction sending unit 44 sends a pulse light output instruction to the second communication device 2. The pulse oscillation instruction receiving unit 45 receives the pulse light output instruction from the first communication device 1. Communication performed by the pulse oscillation instruction sending unit 44 and the pulse oscillation instruction receiving unit 45 is not limited to optical communication; radio communication may be used, for example. The second pulse oscillation unit 46 outputs pulse light to the fourth light coupling unit 47 in accordance with the instruction received by the pulse oscillation instruction receiving unit 45. The fourth light coupling unit 47 couples light pulses input from the second pulse oscillation unit 46 and the optical signal input from the optical modulation unit 12 and outputs the resulting signal to the spatial optical communication unit 14.

The first communication device 1 according to the fifth embodiment may not include the transmit pulse oscillation unit 40 and the third light coupling unit 41. In a case where the first communication device 1 includes the transmit pulse oscillation unit 40 and the third light coupling unit 41, the pulse oscillation instruction sending unit 44 may control the transmit pulse oscillation unit 40 for output of pulse light. For example, the pulse oscillation instruction sending unit 44 may attempt control using reflected light of pulse light in a similar manner to the fourth embodiment, and if reflected light cannot be detected well, it may output a pulse light output instruction to the second communication device 2.

Operation of the Fifth Embodiment

Figure 18:
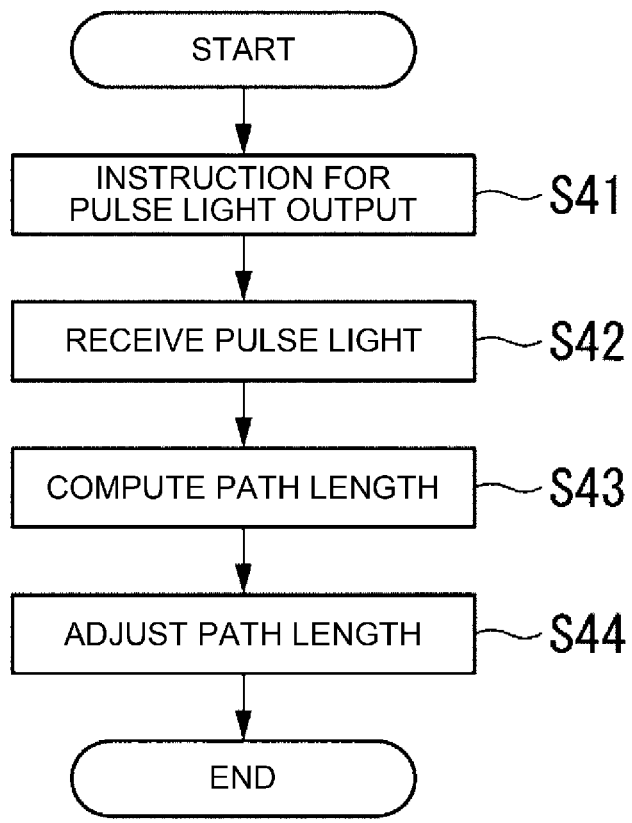
FIG. 18 is a flowchart illustrating the operation of the first communication device according to the fifth embodiment.

FIG. 18 is a flowchart illustrating the operation of the first communication device 1 according to the fifth embodiment.

First, the pulse oscillation instruction sending unit 44 sends a pulse light output instruction to the second communication device 2 (step S41). The pulse oscillation instruction receiving unit 45 of the second communication device 2 receives the output instruction, and the second pulse oscillation unit 46 outputs pulse light to the fourth light coupling unit 47. The pulse light is coupled with an optical signal by the fourth light coupling unit 47 and transmitted to the first communication device 1 by the spatial optical communication unit 14. Steps S42 through S44, which are operations after the first communication device 1 has received the pulse light, are the same as the steps S32 through S34 in the fourth embodiment.

<<Effects>>

As described above, according to the fifth embodiment, the pulse oscillation instruction sending unit 44 of the first communication device 1 makes the second communication device 2 send pulse light, and the multiple spatial optical communication units 14 of the first communication device 1 receive the transmitted pulse light. From the difference in the time of its reception, the first communication device 1 computes the path difference between the second communication device 2 and each spatial optical communication unit 14 of the first communication device 1 and changes the path length. This allows the first communication device 1 to accurately compute the distance between the second communication device 2 and each spatial optical communication unit 14, thus enabling matching of the path lengths of the multiple spatial optical communication units 14.

Sixth Embodiment

Figure 19:
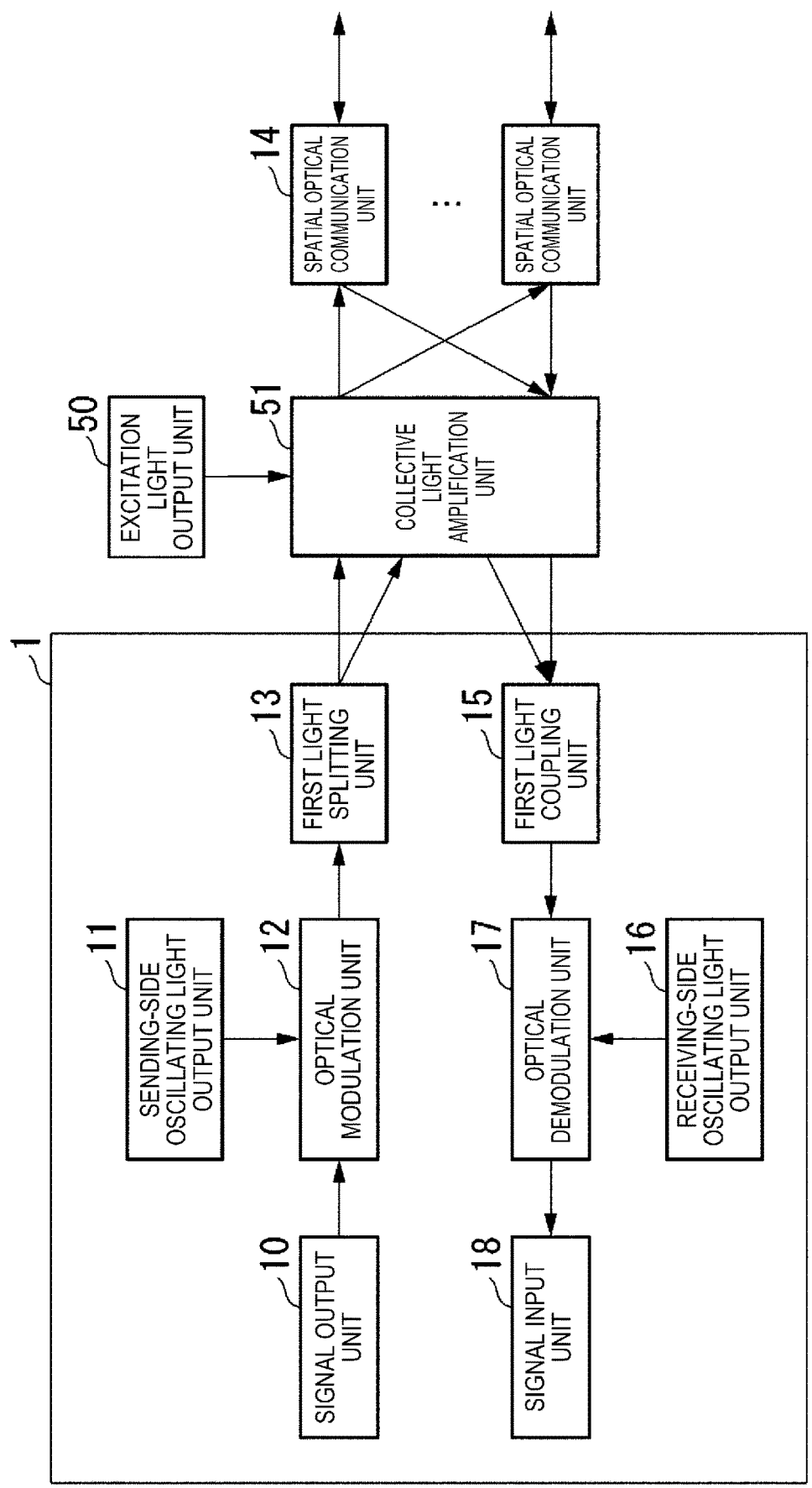
FIG. 19 shows a configuration of the first communication device according to a sixth embodiment.

FIG. 19 shows a configuration of the first communication device 1 according to a sixth embodiment.

The first communication device 1 according to the sixth embodiment includes an excitation light output unit 50 and a collective light amplification unit 51 (an optical amplifier), in addition to the configuration of the first embodiment.

The excitation light output unit 50 outputs excitation light to the collective light amplification unit 51. The collective light amplification unit 51 amplifies multiple optical signals that are input from the first light splitting unit 13 with excitation light input from the excitation light output unit 50, and outputs them to the corresponding spatial optical communication unit 14. The collective light amplification unit 51 also amplifies multiple optical signals that are input from the first light splitting unit 13 with excitation light input from the excitation light output unit 50, and outputs them to the first light coupling unit 15. The collective light amplification unit 51 can be configured as an MC-EDFA (Multicore Erbium-Doped Fiber Amplifier), for example.

An optical signal to be transmitted is input from the optical modulation unit 12 to the first light splitting unit 13, then is split by the first light splitting unit 13, and the split signals are input to the collective light amplification unit 51 and amplified. Subsequently, the respective optical signals are input to the spatial optical communication units 14 and transmitted to the second communication device 2.

An incoming optical signal is received by the spatial optical communication units 14, after which the respective optical signals are input to the collective light amplification unit 51 and amplified. Then, the respective optical signals are input to the first light coupling unit 15.

<<Effects>>

As described above, according to the sixth embodiment, split optical signals can be amplified with a single beam of excitation light. This can eliminate change in the phase of optical signals due to fluctuations of excitation light, compared to the case of using multiple different beams of excitation light.

Other Embodiments

While the embodiments of this invention have been detailed with reference to the drawings, specific configurations are not limited to the ones mentioned above and various design modifications and the like can be made within the scope of the invention.

The configurations of the first through the sixth embodiments can be combined within a possible range where appropriate.

Variations of the First Embodiment

While in the foregoing embodiments an optical signal generated by one optical modulation unit 12 is split, the present invention is not limited thereto. For example, there may be optical modulation units 12 as many as the number of spatial optical communication units 14, where duplicated signals are optically modulated with split beams of oscillating light and optical signals generated by the respective optical modulation units 12 are output to the corresponding spatial optical communication units 14.

While in the foregoing embodiments optical signals received by the respective spatial optical communication units 14 are coupled and the coupled optical signal is demodulated by one optical demodulation unit 17, it is also possible to provide optical demodulation units 17 as many as the number of spatial optical communication units 14, and to optically demodulate signals and then combine the generated signals, for example.

Here, the configuration above is described as a variation of the first embodiment.

Figure 20:
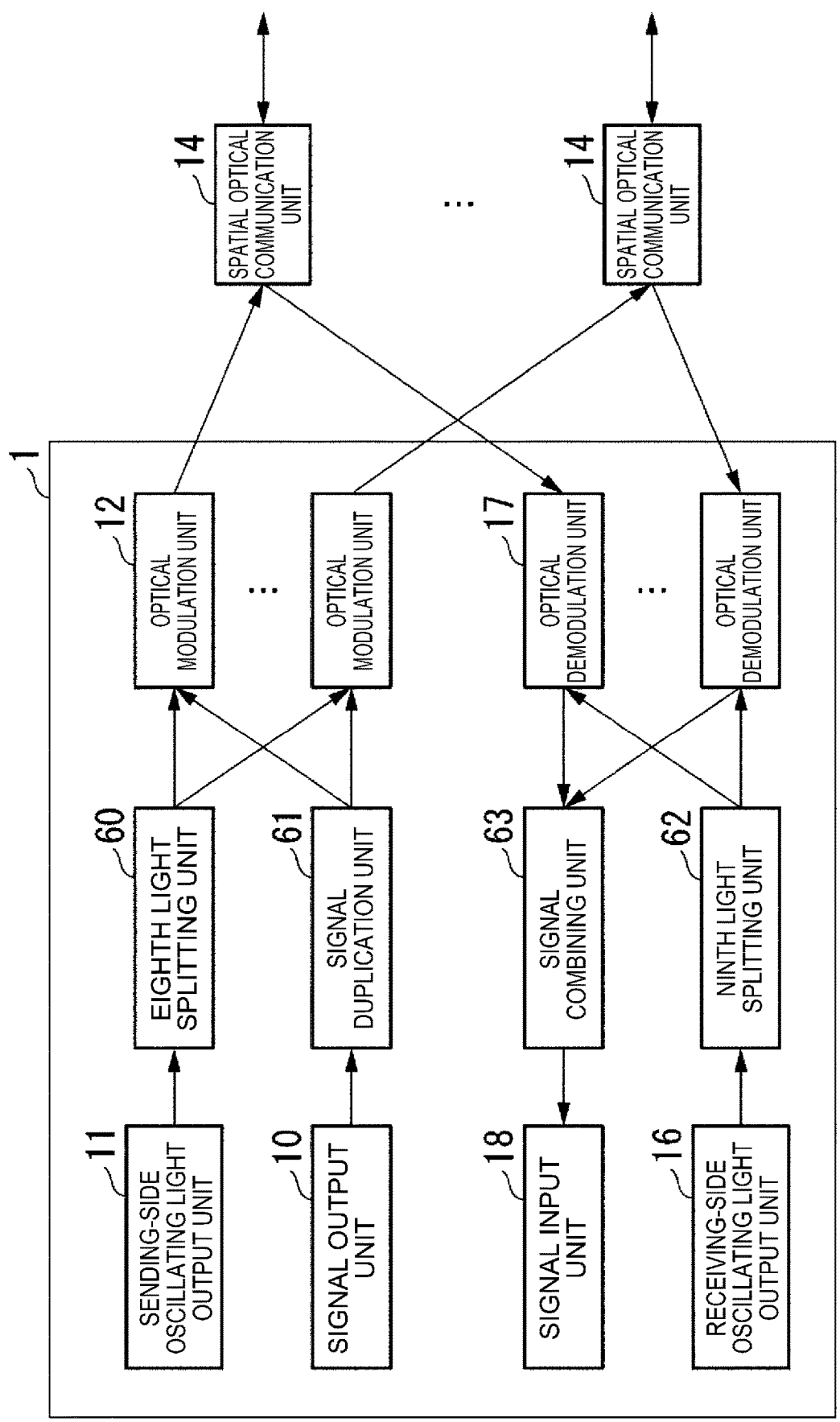
FIG. 20 shows a variation of the first communication device according to the first embodiment.

FIG. 20 shows a variation of the first communication device 1 according to the first embodiment.

Unlike the first communication device 1 shown in FIG. 1, the first communication device 1 shown in FIG. 20 includes optical modulation units 12 and optical demodulation units 17 both as many as the number of the spatial optical communication units 14, and includes an eighth light splitting unit 60, a signal duplication unit 61, a ninth light splitting unit 62, and a signal combining unit 63.

Each of the optical modulation units 12 is connected with the eighth light splitting unit 60, the signal duplication unit 61 and the corresponding spatial optical communication unit 14. Each of the optical demodulation units 17 is connected with the ninth light splitting unit 62, the signal combining unit 63 and the corresponding spatial optical communication unit 14. The eighth light splitting unit 60 is connected with the sending-side oscillating light output unit 11 and the optical modulation unit 12. The signal duplication unit 61 is connected with the signal output unit 10 and the optical modulation unit 12. The ninth light splitting unit 62 is connected with the receiving-side oscillating light output unit 16 and the optical demodulation unit 17. The signal combining unit 63 is connected with the optical demodulation unit 17 and the signal input unit 18.

The eighth light splitting unit 60 splits oscillating light input from the sending-side oscillating light output unit 11 and outputs the split beams of oscillating light to the multiple optical modulation units 12. The signal duplication unit 61 duplicates a signal input from the signal output unit 10 and outputs the duplicated signals to the multiple optical modulation units 12. The ninth light splitting unit 62 splits oscillating light input from the receiving-side oscillating light output unit 16 and outputs the split beams of oscillating light to the multiple optical demodulation units 17. The signal combining unit 63 combines signals input from the multiple optical demodulation units 17 and outputs the combined signal to the signal input unit 18. The variation of the first communication device 1 according to the first embodiment shown in FIG. 20 also achieves similar effects to the first embodiment because a single signal is optically modulated/demodulated with a single beam of oscillating light.

REFERENCE SIGNS LIST

100 optical communication system
1 first communication device
2 second communication device
10 signal output unit
11 sending-side oscillating light output unit
12 optical modulation unit
13 first light splitting unit
14 spatial optical communication unit
15 first light coupling unit
16 receiving-side oscillating light output unit
17 optical demodulation unit
18 signal input unit
141 antenna
142 focal adjustment unit
143 wave front shaping unit
144A, 144B half mirror
145 wave front detection unit
146 wave front control unit
147 optical axis adjustment unit
20 first delay equalization unit
21 second light splitting unit
201 phase difference output unit
202 transmission phase adjustment unit
203 reception phase adjustment unit
204 third light splitting unit
30 sending-side second delay equalization unit
31 receiving-side second delay equalization unit
32 fourth light splitting unit
33 fifth light splitting unit
34 first path-length unknown section
35 second path-length unknown section
301 first oscillating light output unit
302 second light coupling unit
303 phase control unit
304 sixth light splitting unit
305 first phase adjustment unit
40 transmit pulse oscillation unit
41 third light coupling unit
42 third delay equalization unit
43 pulse calculation unit
44 pulse oscillation instruction sending unit
45 pulse oscillation instruction receiving unit
46 second pulse oscillation unit
47 fourth light coupling unit
421 transmission path length adjustment unit
422 reception path length adjustment unit
423 seventh light splitting unit
50 excitation light output unit
51 collective light amplification unit
60 eighth light splitting unit
61 signal duplication unit
62 ninth light splitting unit
63 signal combining unit

The invention claimed is:

1. A communication device comprising:
a light source configured to output light;
an optical splitter configured to split the light output by the light source into a plurality of split beams;
a plurality of spatial optical communication devices provided in correspondence to the plurality of split beams, wherein the spatial optical communication devices respectively transmit a corresponding split beam which is input from the optical splitter to a partner communication device across space, and
a delay equalizer provided between the optical splitter and the spatial optical communication devices, wherein the delay equalizer controls phases of the split beams and outputs the split beams to the spatial optical communication devices wherein the delay equalizer matches a phase of light which is input from the optical splitter with a phase of light which is output to the spatial optical communication devices, and matches a phase of light which is input from the spatial optical communication devices with a phase of light which is output to an optical coupler.

2. A communication device comprising:

a light source configured to output light;

an optical splitter configured to split the light output by the light source into a plurality of split beams;

a plurality of spatial optical communication devices provided in correspondence to the plurality of split beams, wherein the spatial optical communication devices respectively transmit a corresponding split beam which is input from the optical splitter to a partner communication device across space, and a delay equalizer provided between the optical splitter and the spatial optical communication devices, wherein the delay equalizer controls phases of the split beams and outputs the split beams to the spatial optical communication devices wherein the delay equalizer changes a length of an optical path in the delay equalizer based on pulse light which is received by the spatial optical communication devices across space.

3. The communication device according to claim 2, wherein the pulse light is pulse light resulting from reflection of pulse light which was output by one of the spatial optical communication devices.

4. An optical communication system comprising:

the communication device according to claim 2 further comprising a phase adjustment request transmitter for controlling output of pulse light by the partner communication device; and the partner communication device.

5. A communication device comprising:

a light source configured to output light;

an optical splitter configured to split the light output by the light source into a plurality of split beams;

a plurality of spatial optical communication devices provided in correspondence to the plurality of split beams, wherein the spatial optical communication devices respectively transmit a corresponding split beam which is input from the optical splitter to a partner communication device across space, a delay equalizer provided between the optical splitter and the spatial optical communication devices, wherein the delay equalizer controls phases of the split beams and outputs the split beams to the spatial optical communication devices, and a multicore erbium-doped fiber amplifier (MC-EDFA) provided between the optical splitter and the spatial optical communication devices, wherein the MC-EDFA optical amplifier optically amplifies the plurality of split beams input from the optical splitter with a single beam of excitation light.

* * * * *